United States Patent [19]

Balmforth et al.

[11] Patent Number: 5,187,795

[45] Date of Patent: Feb. 16, 1993

[54] PIPELINED SIGNAL PROCESSOR HAVING A PLURALITY OF BIDIRECTIONAL CONFIGURABLE PARALLEL PORTS THAT ARE CONFIGURABLE AS INDIVIDUAL PORTS OR AS COUPLED PAIR OF PORTS

[75] Inventors: Kevin D. Balmforth; Gary A. Bates, both of Fullerton; Steven P. Davies, Ontario; Hans L. Habereder, Orange; R. Loyd Harrison, Fullerton; Donald M. Hopp, Yorba Linda; George G. Ricker, Fullerton, all of Calif.

[73] Assignee: Hughes Aircraft Company, Los Angeles, Calif.

[21] Appl. No.: 303,790

[22] Filed: Jan. 27, 1989

[51] Int. Cl.⁵ .................................. G06F 9/28
[52] U.S. Cl. ........................ 395/800; 364/DIG. 1; 364/229; 364/229.2; 364/231.8; 364/258; 364/736; 395/800
[58] Field of Search ............... 364/200 MS File, 736, 364/900 MS File; 395/775, 800, 725

[56] References Cited

U.S. PATENT DOCUMENTS

| | | | |
|---|---|---|---|
| 3,828,325 | 8/1974 | Stafford et al. | 364/200 |
| 4,096,566 | 6/1978 | Borie et al. | 364/200 |
| 4,393,468 | 7/1983 | New | 364/200 |
| 4,467,447 | 8/1984 | Takahashi et al. | 364/900 |
| 4,541,048 | 9/1985 | Propster et al. | 364/200 |
| 4,598,358 | 7/1986 | Boddie et al. | 364/200 |
| 4,627,026 | 12/1986 | Di Guigno | 364/900 |
| 4,716,527 | 12/1987 | Graciotti | 364/200 |
| 4,744,078 | 5/1988 | Kowalczyk | 370/85 |
| 4,760,525 | 7/1988 | Webb | 364/200 |
| 4,794,517 | 12/1988 | Jones et al. | 364/200 |
| 4,833,605 | 5/1989 | Terada et al. | 364/200 |
| 4,878,166 | 10/1989 | Johnson et al. | 364/200 |
| 4,912,636 | 3/1990 | Magar et al. | 364/200 |
| 4,959,776 | 9/1990 | Deerfield et al. | 364/200 |
| 4,972,314 | 11/1990 | Getzinger et al. | 364/200 |

Primary Examiner—Thomas C. Lee
Assistant Examiner—Mehmet Geckil
Attorney, Agent, or Firm—Wanda K. Denson-Low

[57] ABSTRACT

A signal processor comprising a split pipelined parallel processor which processes data signals from external signal sources and provides signal processing functions utilizing a plurality of data formats. The signal processor comprises an external interface unit having a serial control port and a plurality of bidirectional parallel ports. The interface unit transfers control and data signals between the signal processor and external devices. The parallel ports are configurable as individual parallel ports or coupled pairs which form a port having the combined data path of the two coupled ports. An arithmetic element controller comprising a microprogram memory and a control program memory is coupled to the interface unit which loads applications programs into the control program memory and executes the programs. The arithmetic element controller controls the processing of control and data signals in the signal processor. A plurality of pipelined arithmetic elements are coupled to the arithmetic element controller, each comprising a data store memory, a multiplier and a register and arithmetic logic unit. Each arithmetic element has its data store memory coupled to the external interface unit to receive and store data signals, and to its multiplier and the register and arithmetic logic unit in order to perform fixed and floating point arithmetic operations on the data stored in the data store memory. These arithmetic operations are performed in accordance with application program and microprogram instructions contained in the control program and the microprogram memories. The persent invention provides for a high performance architecture for use with vector and matrix signal processing algorithms that minimizes the amount of hardward needed to implement them.

28 Claims, 13 Drawing Sheets

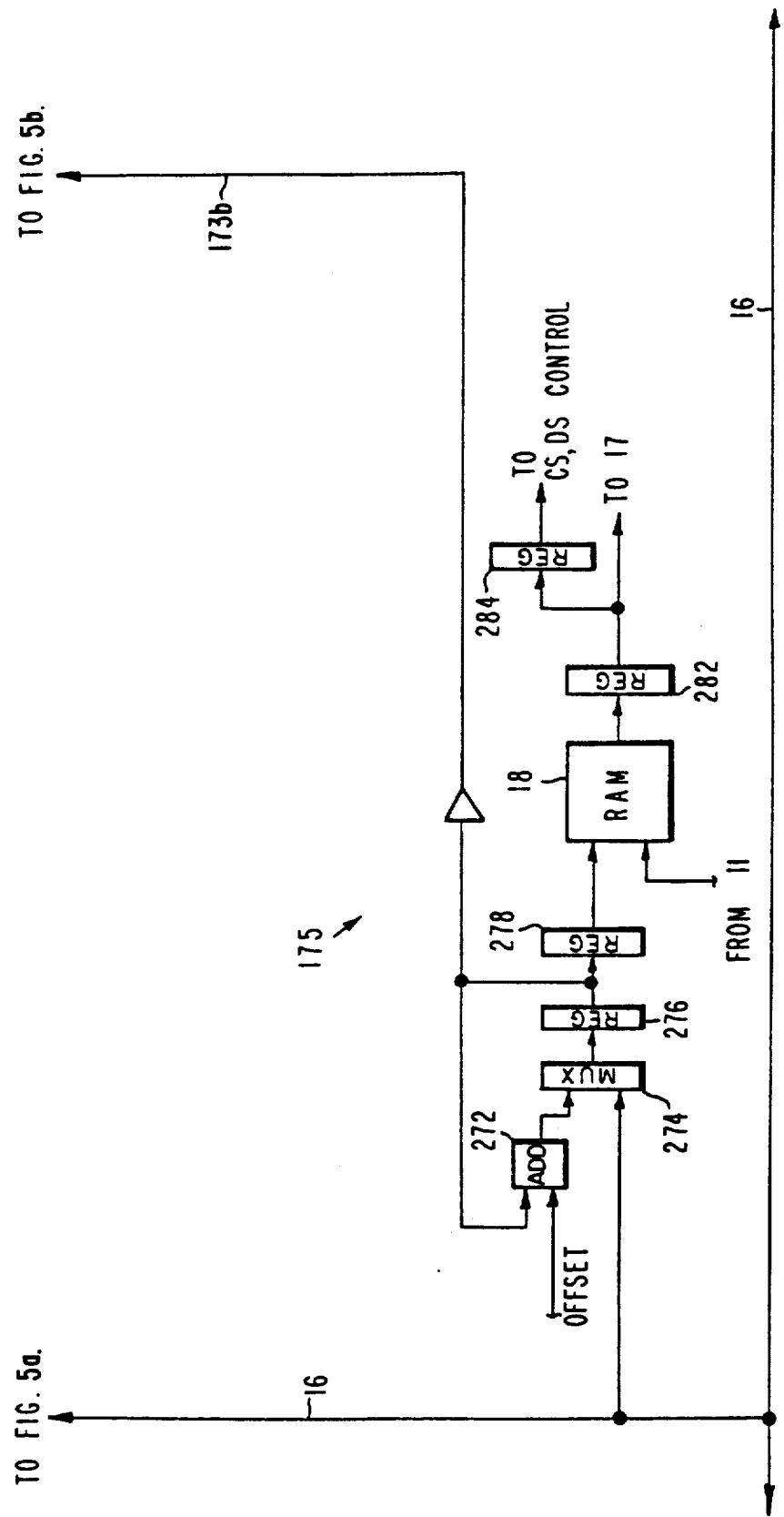

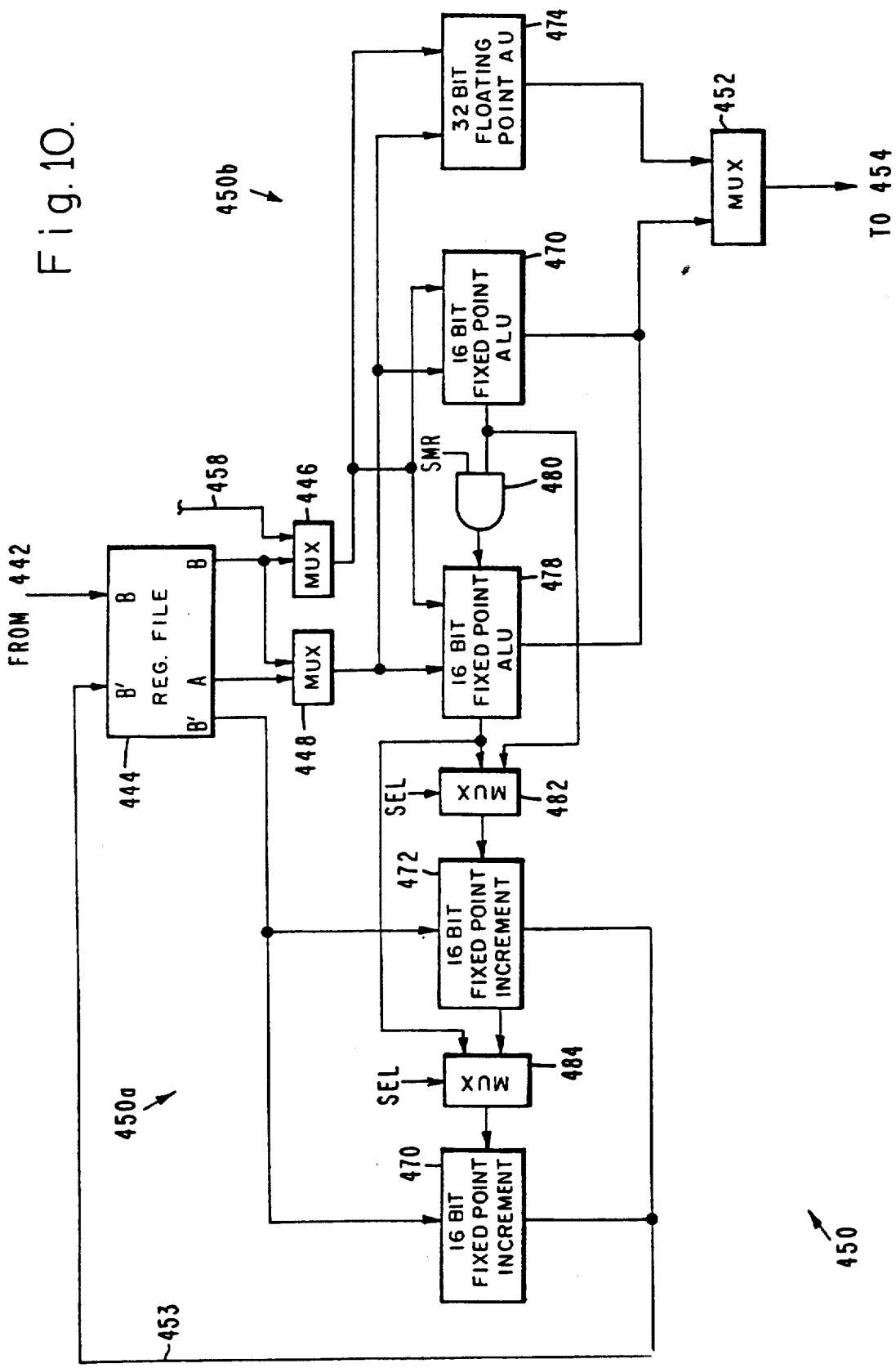

PIPELINED SIGNAL PROCESSOR HAVING A PLURALITY OF BIDIRECTIONAL CONFIGURABLE PARALLEL PORTS THAT ARE CONFIGURABLE AS INDIVIDUAL PORTS OR AS COUPLED PAIR OF PORTS

BACKGROUND OF THE INVENTION

The present invention generally relates to digital signal processing systems and in particular to a digital signal processor that has a split pipeline architecture that operates on multiple data formats employing multiple memories to accomplish high speed digital signal processing functions.

The ability to perform sophisticated vector and scaler arithmetic operations in real time is a key requirement of signal processing systems. Often, however, this requirement is also accompanied by severe physical constraints upon the size, weight, power and cooling of the signal processing system. In the past, signal processor designers have had to compromise among competing requirements, many times resulting in processors with less than adequate performance.

Conventional signal processors may also be limited in performance due to relatively slow system clock rates of around five megahertz, and limited capability to operate on 16 bit fixed point data. The fixed point operational limitations of the such conventional signal processor has become significant in many application environments. Many signal processing algorithms require arithmetic computations having a large dynamic range, making 32 bit floating point processing necessary.

The ability to network modular signal processors allows a system to efficiently meet a wide range of applications. Many signal processors are limited in their capability for networking.

Conventional processor architectures may also impose hardware restrictions upon the microinstruction set employed by the system, which may result in convoluted, costly and maintenance intensive software development. Hence, such conventional signal processors do not provide flexible processing systems for many current applications.

SUMMARY OF THE INVENTION

In order to overcome the above-mentioned limitations of conventional signal processors, the present invention provides for a signal processor that provides for 32 bit floating point or 16 bit fixed point operations, and which may be networked with up to 16 similar processors. Each of the components comprising the signal processor are designed to achieve the dual arithmetic operation and networking capability. The signal processor implements a modified Harvard single instruction multiple data (SIMD) architecture with separate micro program store, control store, and data store memories, an external interface comprising four independent 16 bit input/output ports operating with direct memory access to the data store memories, and a fault tolerant bus protocol. A multi-memory vector/scaler address generator, pipelined multi-mode multipliers which include 32 bit adders, and pipelined multi-mode register and arithmetic logic units are also provided. A microinstruction set is employed that permits interposed processing of four 16 bit fixed point or two 32 bit floating point parallel channels on a clock by clock basis.

The external interface has a serial control port and a plurality of bidirectional configurable parallel ports. The external interface permits transfer of control and data signals between the signal processor and external devices, including other networked processors. The four 16 bit data ports are organized into pairs wherein each of the pairs can operate as two 16 bit ports or a single 32 bit port. One 16 bit port is employed as a parallel control port which may communicate with up to 16 external devices. The external interface allows the signal processor to communicate with external devices in terms of control and data signals, and provides for direct memory addressing of the data store memory independent of the arithmetic element controller.

A plurality of input/output modes are supported by the external interface, including sensor mode and signal processor bus mode. The sensor mode supports up to 16 devices with asynchronous double handshake synchronous word transfer protocols. The sensor mode is intended to support streaming sensor data input and output applications. The signal processor bus mode supports a multiple source multiple destination scheme with a synchronous variable length block transfer protocol.

An arithmetic element controller controls the processing of control and data signals in the signal processor by means of two primary address generators. The first address generator generates memory addresses for the data store and control store memories in response to control signals derived from the microprogram memory. The second address generator processes memory requests derived from the external interface to generate control store memory addresses that read parameters stored in the control store memory, and from which data store memory addresses are generated. A memory access controller controls access to the respective data store and control store memories.

The arithmetic element controller operates to store and execute applications programs and provides address generation and arithmetic control to the arithmetic element. A control store memory address generator and address generator logic are provided to facilitate application program execution. The address generator comprises address registers, address counters, an arithmetic unit, sixteen 16 bit general purpose registers and associated logic to generate addresses for the control and data store memories. Applications programs comprise 16 bit addresses of microcode primitives stored in the micro store memory. Application program variables are 16 bit addresses or constants stored in the control store memory.

A plurality of pipelined arithmetic elements are coupled to the arithmetic element controller, each comprising one data store memory, a multiplier, and a register and arithmetic logic unit. The arithmetic element controller and arithmetic elements operate together as a computational engine on the data as directed by the applications program. Each arithmetic element provides circuitry which performs pipelined arithmetic computations required for vector/matrix signal processing functions.

The arithmetic element is partitioned into two pipelined parallel processors. Each half of the arithmetic element comprises a data store memory, data store index logic, a multiplier and a register and arithmetic logic unit. The arithmetic element provides for a channelized arithmetic engine capable of handling multiple data streams which require identical processing. The data store index logic provides for four independent 16 bit words to be addressed in parallel, relative to four 16 bit offsets provided by the corresponding register and arithmetic logic units. This provides data dependent addressing in the arithmetic element.

The multiplier provides for computation of the product of two data words loaded into its input registers and places this product in an output register. Multiplier input and output data formats include 32 bit floating point and dual 16 bit fixed point formats. The multiplier includes a 32 bit adder which is used for multiplication of complex numbers in the dual 16 bit format. Each multiplier unit performs one 32 bit or two 16 bit multiply operations per clock cycle. The add operation can be performed during each clock cycle that dual 32 bit fixed point products are generated.

The register and arithmetic logic unit performs arithmetic and logical operations on multiplier, control store and data store data using 32 bit floating point 32 bit fixed point and dual 16 bit fixed point data formats. Each register and arithmetic logic unit performs one 32 bit or two 16 bit operations per clock cycle.

The present invention provides for an architecture interconnected in a manner which supports fabrication using high density VLSI microcircuits, and a high performance architecture for use with vector and matrix signal processing algorithms that minimizes the amount of hardware needed to implement them.

BRIEF DESCRIPTION OF THE DRAWING

The various features and advantages of the present invention may be more readily understood with reference to the following detailed description taken in conjunction with the accompanying drawing, wherein like reference numerals designate like structural elements, and in which:

FIGS. 5a-5c are detailed data flow diagrams illustrating the logic circuits of the first address generator of the arithmetic element controller of FIG. 4;

FIG. 9b is a detailed diagram of the fixed and floating point processor of the register and arithmetic logic unit of FIG. 9a;

FIG. 10 is a detailed diagram of the register file and fixed and floating point processor of the register and arithmetic logic unit of FIG. 9a;

FIG. 11 is a detailed diagram of the register file of the register and arithmetic logic unit of FIG. 9a;

DETAILED DESCRIPTION

Figure 1:
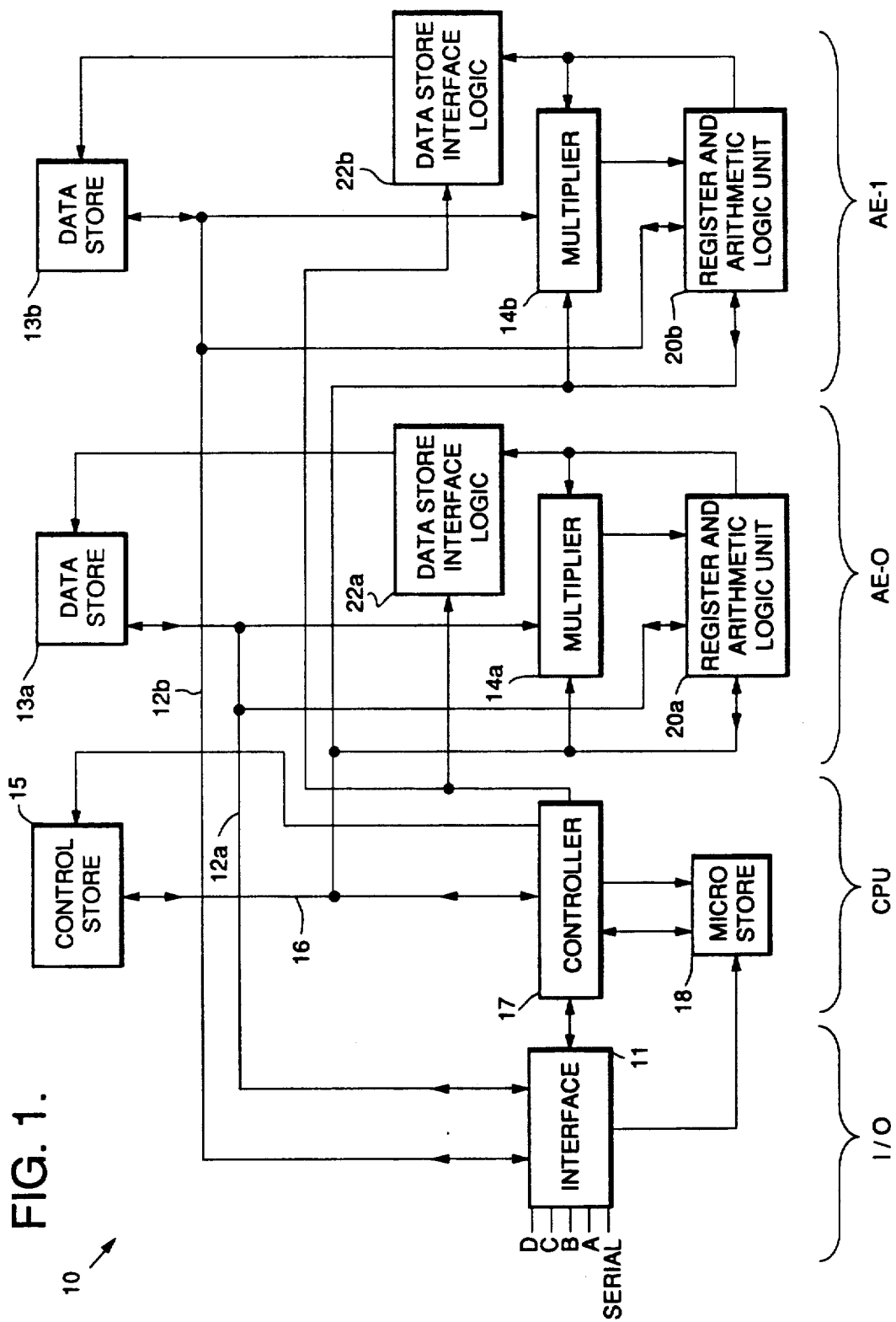
FIG. 1 is a block diagram of a signal processor in accordance with the principles of the present invention.

Referring to FIG. 1, shown therein is a block diagram of a signal processor 10 incorporating in accordance with the principles of the present invention. The signal processor 10 comprises four main sections: an input/output section, designated as I/O, a central procession unit designated as CPU, and two arithmetic elements, designated as AE0 and AE1. The input/output section includes an external interface unit 11, generally known as a computer interface, which provides a plurality of configurable input/output ports. The external interface unit 11 is coupled by way of data busses 12a, 12b to two data store memories 13a, 13b, that are employed to store data, and to two multipliers 14a, 14b, and two register and arithmetic logic units (RALU) 20a, 20b, which operate on the data. The data store memories 13a, 13b typically store data in a predefined packed format in order to conserve memory space, in a manner which is generally known in the art.

A control store memory 15, which is employed to store control codes, is coupled by way of a control store bus 16 to an arithmetic element controller 17, to the multipliers 14a, 14b and to two register and arithmetic logic units 20a, 20b made in accordance with the principles of the present invention. A micro store memory 18 is coupled to the arithmetic element controller 17 and is employed to store microcode instructions which are utilized by the data store memories 13a, 13b, multipliers 14a, 14b, and the register and arithmetic logic units 20a, 20b.

The processor 10 generally functions as follows. Signals to be processed by the processor 10 are received by way of the computer interface 11 and stored in the data store memories 13a, 13b. Microcode instructions defining the processing parameters of the arithmetic elements of the processor and what steps are to be performed by the arithmetic elements, AE0, AE1, are stored in the micro store memory 18. An application program consisting of pointers to microcode instructions, programmable coefficients to be used by the arithmetic elements during computations, and intermediate data processing results from the arithmetic elements are stored in the control store memory 15. The arithmetic element controller 17 executes application programs which cause the microcode instructions to be executed and the data to be processed. The arithmetic elements AE0, AE1, operate as parallel pipeline processors, to process the data in accordance with the microcode instructions, under control of the arithmetic element controller, and in a conventionally understood manner.

Control parameters comprising programmable coefficients are passed from the control store memory 15 to the multipliers 14a, 14b and the register and arithmetic logic units 20a, 20b, and the data from the data store memories 13a, 13b are processed by the arithmetic elements AE0 and AE1, under control of the arithmetic element controller 17 in a conventionally understood manner.

Figure 2:
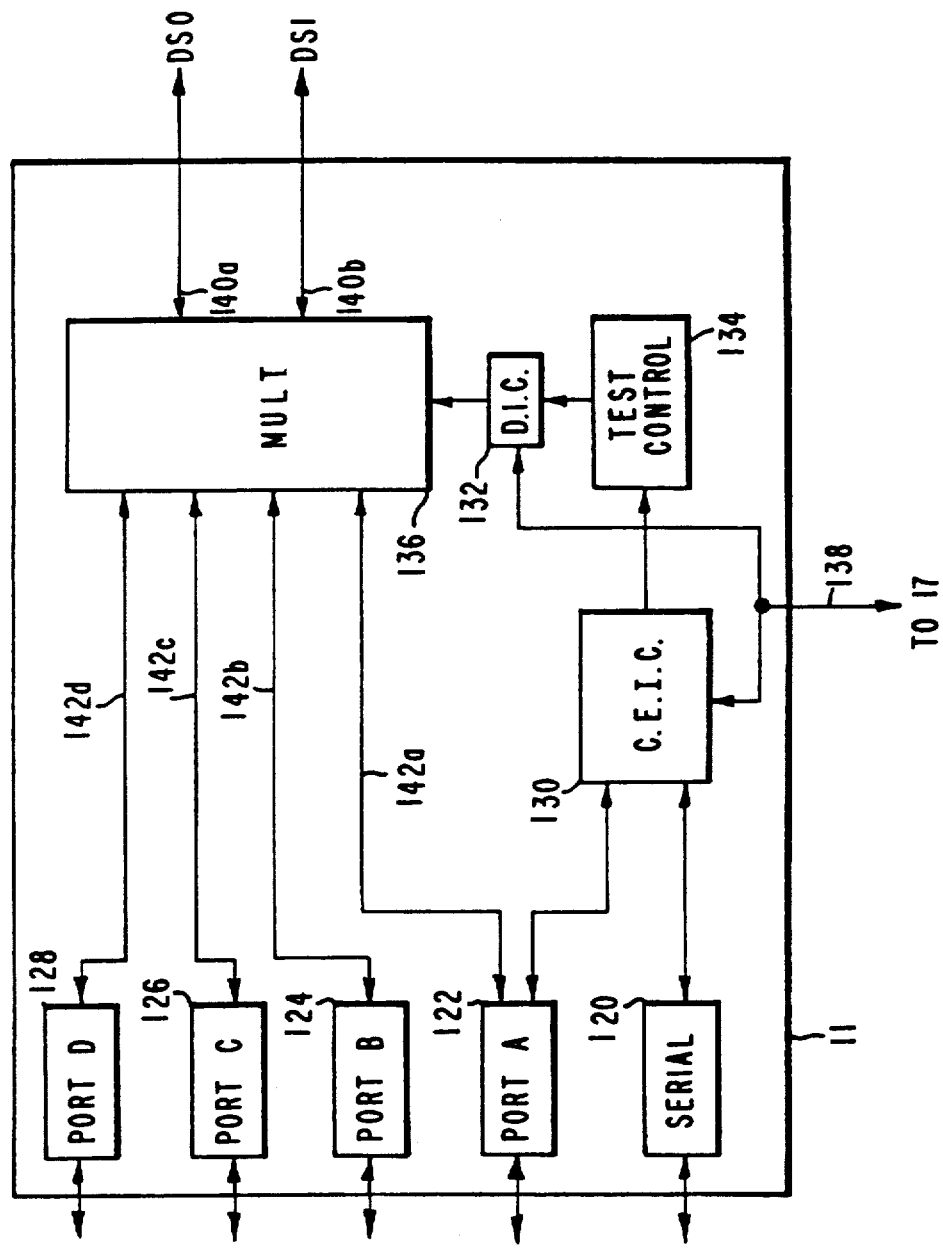
FIG. 2 is a diagram of an external interface for use in the signal processor of FIG. 1.

Referring to FIG. 2, a detailed diagram of the computer interface 11 of FIG. 1 is shown. The computer interface 11 comprises a serial control port 120 and four parallel ports 122, 124, 126, 128. Each of the parallel ports are configured in substantially the same manner, with each having sixteen (16) data signal lines and four (4) control lines. The serial port 120 and the first parallel port 122 are employed to transfer control signals between external devices and the signals processor 10.

The serial port 120 and the first parallel port 122 are coupled to a first interface controller 130 which has inputs coupled to the arithmetic element controller 17 of the signals processor 10. The first interface controller 130 is also coupled to a test controller 134 which is employed to implement testing of the signal processor 10. A second interface controller 132 has an input coupled to the arithmetic element controller 17 in a manner similar to that of the first interface controller 130. The second interface controller 132 is also coupled to a multiplexer 136, or data transfer network as it is commonly known, which has four inputs coupled to each of the parallel ports 122, 124, 126, 128 and has two output ports coupled to the data busses 12a, 12b of the signal processor 10.

The computer interface 11 implements a variety of communications protocols. These protocols include a serial protocol which permits communication between one external device and up to sixteen (16) signal processors 10.

A sensor protocol employed to efficiently transfer data from sonar and radar sensors to the signal processor 10 and from the signal processor 10 to the data processors or display or storage devices. The sensor protocol may operate in 16 bit or 32 bit modes which utilize 16 bit data busses 142. In this sensor mode, data may be transferred using any one or selected combinations of the four 16 bit busses to accomplish 16 bit and 32 bit data transfers.

A signal processor bus protocol is also available which employs a synchronous protocol. This protocol provides support for data transfers between signal processors. The signal processor bus protocol may operate in 16 bit or 32 bit modes which utilize 16 bit data busses 142. In this signal processor bus mode, data may also be transferred using any one or selected combinations of the four 16 bit busses to accomplish 16 bit and 32 bit data transfers. In the present invention parallel ports A and B 122, 124 may be combined and parallel ports C and D 126, 128 may be combined, but such combinations are only indicated for the purposes of their implementation in the signal processor 10. In other applications, other ports may be combined by those skilled in the art as the particular application arises. In the bus protocol, the present invention takes advantage of the circuitry which implements control of tristate buffers provided at the inputs of each of the parallel ports 122, 124, 126, 128.

Figure 3:
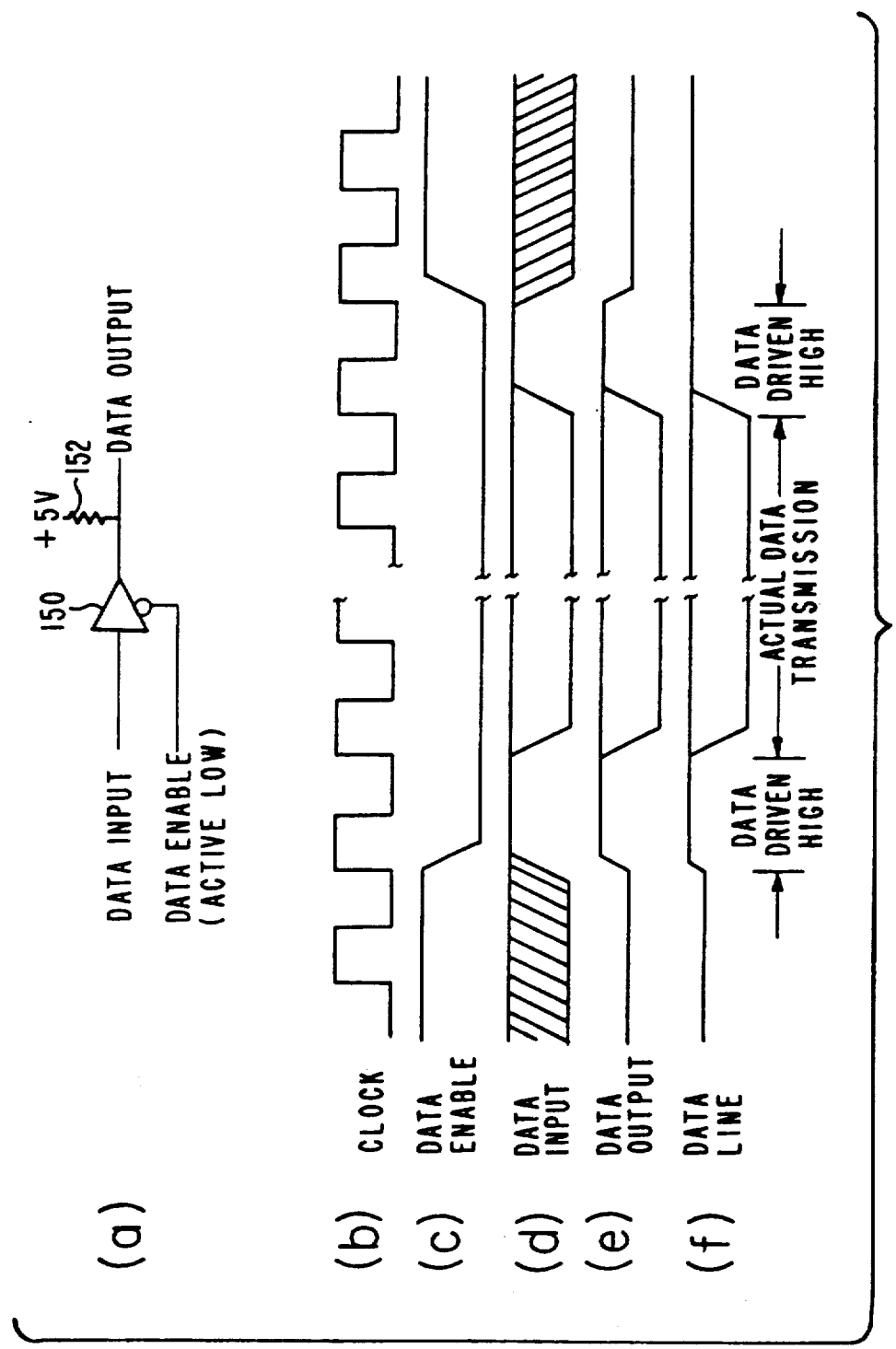
FIGS. 3a-3f show a diagram of circuitry which controls the tristate buffers of the computer interface of FIG. 2 along with timing diagrams therefor.

In order to increase the speed of operation of the external interface unit, the present invention also provides for circuitry coupled to the four parallel ports which controls tristate buffers on the control and data busses when in the parallel bus mode which provides open-collector characteristics. FIG. 3a illustrates the tristate buffer circuitry. This circuitry includes a buffer amplifier 150 and a pull-up resistor 152 coupled between a voltage source and the data output of the amplifier 150. Input data signals and data enable signals are applied to the amplifier 150 in the manner shown in FIG. 3a.

The tristate buffer control scheme operates as follows. The data input signals are preceded and followed by a high voltage level ("1") for one clock cycle to drive the data lines to a known state before and after each transmission. The resistor 152 is a line terminator resistor with a drive voltage level chosen to maintain the known value of "1". However, the pull-up resistor 152 and drive voltage level are normally sufficient to drive the tristated lined to a high state fast enough to allow for open collector buffers. FIGS. 3b–f show timing diagrams illustrating the operation of the circuit of FIG. 3a, and these diagrams should be self explanatory and well-understood by those skilled in the art.

The following Tables 1a–3d define all the parameters for each of the ports including control signal definitions, control signals associated with each of the ports, message formats, error handling and valid external functions (EXFs).

TABLE 1a

| Port A Control Signal Definition | | | | |
|---|---|---|---|---|
| Config. | CONTSIGA(3) | CONTSIGA(2) | CONTSIGA(1) | CONTSIGA(0) |
| 16 bit bus | BID_L | DATAV_L | BIDVAL_L | CLK |
| 32 bit bus | BID_L | DATAV_L | BIDVAL_L | CLK |
| 16 bit sensor input mode | SYNC_L | ACK_L | VSPEN_L | DATAV_L |
| 16 bit sensor output mode | SYNC_L | DATAV_L | VSPEN_L | DATARQ_L |
| 32 bit sensor input mode | SYNC_L | ACK_L | VSPEN_L | DATAV_L |
| 32 bit sensor output mode | SYNC_L | DATAV_L | VSPEN_L | DATARQ_L |

TABLE 1b

| Port B Control Signal Definition | | | | |
|---|---|---|---|---|
| Config. | CONTSIGB(3) | CONTSIGB(2) | CONTSIGB(1) | CONTSIGB(0) |
| 16 bit bus | BID_L | DATAV_L | BIDVAL_L | CLK |
| 32 bit bus | n/a | n/a | n/a | n/a |
| 16 bit sensor input mode | SYNC_L | ACK_L | VSPEN_L | DATAV_L |
| 16 bit sensor output mode | SYNC_L | DATAV_L | VSPEN_L | DATARQ_L |
| 32 bit sensor input mode | addr(3) of source | addr(2) of source | addr(1) of source | addr(0) of source |
| 32 bit sensor output mode | addr(3) of dest. | addr(2) of dest. | addr(1) of dest. | addr(0) of dest. |

TABLE 1c

| Config. | Port C Control Signal Definition | | | |
|---|---|---|---|---|
| | CONTSIGC(3) | CONTSIGC(2) | CONTSIGC(1) | CONTSIGC(0) |
| 16 bit bus | BID_L | DATAV_L | BIDVAL_L | CLK |
| 32 bit bus | BID_L | DATAV_L | BIDVAL_L | CLK |
| 16 bit sensor input mode | SYNC_L | ACK_L | VSPEN_L | DATAV_L |
| 16 bit sensor output mode | SYNC_L | DATAV_L | VSPEN_L | DATARQ_L |
| 32 bit sensor input mode | SYNC_L | ACK_L | VSPEN_L | DATAV_L |
| 32 bit sensor output mode | SYNC_L | DATAV_L | VSPEN_L | DATARQ_L |

TABLE 1d

| Config. | Port D Control Signal Definition | | | |
|---|---|---|---|---|
| | CONTSIGD(3) | CONTSIGD(2) | CONTSIGD(1) | CONTSIGD(0) |
| 16 bit bus | BID_L | DATAV_L | BIDVAL_L | CLK |
| 32 bit bus | n/a | n/a | n/a | n/a |
| 16 bit sensor input mode | SYNC_L | ACK_L | VSPEN_L | DATAV_L |
| 16 bit sensor output mode | SYNC_L | DATAV_L | VSPEN_L | DATARQ_L |
| 32 bit sensor input mode | addr(3) of source | addr(2) of source | addr(1) of source | addr(0) of source |
| 32 bit sensor output mode | addr(3) of dest. | addr(2) of dest. | addr(1) of dest. | addr(0) of dest. |

The serial port 120 is a control and data transfer port. It has the following control and data signals:

TABLE 2a

| Serial Port Description | | | |
|---|---|---|---|
| Control signals: | Type: | Direction: | Description: |
| SCLOCK | control | input | serial port clock |
| DATA_EN_L | control | input | data enable |
| OUT_RQ_L | control | output | output request |
| INTR_RQ_L | control | output | interrupt request |
| SDATAIO | data | bidirectional | serial data |

The serial port 120 employs a serial packet message format. The serial port error handling is such that transfer is terminated and INTR_RQ_L is asserted if an undefined or invalid EXF occurs. The control element must read the signal processor 10 status to determine the error type. Valid EXFs include all except INTR, LDAT and MAIL In 16 bit and 32 bit bus modes, port A (16 bit) and port AB (32 bit) operate as control and data transfer ports. All ports operate as data transfer ports. However, in other applications, all port configurations may be employed as control and data transfer ports if desired.

TABLE 2b

| Parallel Port Description | | | |
|---|---|---|---|
| Signals: | Type: | Direction: | Description: |
| CLK | control | bidirectional | clock |
| BIDVAL_L | control | bidirectional | bid period valid |
| DATAV_L | control | bidirectional | data valid |
| BID_L | control | bidirectional | bid line |
| DPORTA(15:0) | data | bidirectional | data |
| DPORTB(15:0) | data | bidirectional | data |
| DPORTC(15:0) | data | bidirectional | data |
| DPORTD(15:0) | data | bidirectional | data |
| DPORTAB(31:0) | data | bidirectional | data |
| DPORTCD(31:0) | data | bidirectional | data |

In 16 bit and 32 bus modes, all parallel ports 122, 124, 126, 128 employ a packet message format. The parallel port error handling is such that the destination device will send an "ACK/NAK status word" back to the source device after the packet transfer is completed. The transfer is not accepted (NAK) if the status word indicates a work count error, diagonal parity error, FIFO overflow, or undefined or invalid EXF; otherwise, the packet is accepted (ACK). If a NAK is received, the source device will retransmit the packet up to 7 more times, for a total of 8 transmission attempts, then abort the transfer and (if the source device is a signal processor) set the "port output error" flag in the computer interface status word. If the source detects a bus collision during the transfer, it will abort the transfer and retry. If the bus goes into a masterless state, it will initiate the recovery sequence. All EXFs are valid if ports A or AB are the control port; otherwise, only LDAT, MAIL and PORT are valid. LDAT and MAIL are valid EXFs for ports B, C, D and CD. With reference to bidding, and the bid period and bid line signals recited in the above tables, this subject is well known in the signal processing art, and reference to the text *Computer Networks*, by Andrew S. Tanenbaum, at page 296, entitled "A Bit Map Protocol," Prentice Hall, 1986, which details a time slice bidding technique which may be employed in the interface unit of the present invention.

In 16 bit sensor mode, the parallel ports operate as input or output data transfer ports. For the input and output modes, respectively, identified in the direction column, the following apply as indicated:

TABLE 2c

| Parallel Port Description - 16 bit sensor input mode | | | |
|---|---|---|---|
| Signals: | Type: | Direction: | Description: |
| DATAV_L | control | input | data available |
| VSPEN_L | control | input | signal proc. enable |
| ACK_L | control | output | data acknowledge |
| SYNC_L | control | input | sync |
| DPORTA(15:0) | data | input | data |
| DPORTB(15:0) | data | input | data |
| DPORTC(15:0) | data | input | data |
| DPORTD(15:0) | data | input | data |

TABLE 2d

| Parallel Port Description - 16 bit sensor output mode | | | |
|---|---|---|---|
| Signals: | Type: | Direction: | Description: |
| DATARQ_L | control | input | data request |
| VSPEN_L | control | input | signal proc. enable |
| DATAV_L | control | output | data available |
| SYNC_L | control | output | sync |
| DPORTA(15:0) | data | output | data |
| DPORTB(15:0) | data | output | data |
| DPORTC(15:0) | data | output | data |
| DPORTD(15:0) | data | output | data |

In 16 bit sensor mode, all parallel ports 122, 124, 126, 128 employ a data only message format. The parallel port error handling is such that if a protocol error occurs, the transfer will be aborted, the port will be put in an idle state, and the "port sync handshake error" flag in the computer interface status word will be set. EXFs are not applicable.

In 32 bit sensor mode, and for the input and output modes, respectively, identified in the direction column below, the following apply as indicated:

TABLE 2e

| Parallel Port Description - 32 bit sensor input mode | | | |
|---|---|---|---|
| Signals: | Type: | Direction: | Description: |
| DATAV_L | control | input | data available |
| VSPEN_L | control | input | signal proc. enable |
| ACK_L | control | output | data acknowledge |
| SYNC_L | control | input | sync |
| ADDRB(3:0) | data | input | source device addr. |
| ADDRD(3:0) | data | input | source device addr. |

TABLE 2e-continued

| Parallel Port Description - 32 bit sensor input mode | | | |
|---|---|---|---|
| Signals: | Type: | Direction: | Description: |
| DPORTAB(31:0) | data | input | data |
| DPORTCD(31:0) | data | input | data |

TABLE 2f

| Parallel Port Description - 32 bit sensor output mode | | | |
|---|---|---|---|
| Signals: | Type: | Direction: | Description: |
| DATARQ_L | control | input | data request |
| VSPEN_L | control | input | signal proc. enable |
| DATAV_L | control | output | data available |
| SYNC_L | control | output | sync |
| ADDRB(3:0) | data | output | destination device addr. |
| ADDRD(3:0) | data | output | destination device addr. |
| DPORTAB(31:0) | data | output | data |
| DPORTCD(31:0) | data | output | data |

As in the case of the 16 bit parallel ports, the error handling and external functions are the same.

The following Tables 3a-3d provide a description of all external functions for the computer interface 11.

TABLE 3a

| | | | Control EXFs | | | | | | |
|---|---|---|---|---|---|---|---|---|---|
| | | | Data | Reply | Reply | State | | Port | |
| Name | Code | Description | Words | Type | Words | Run | Halt | Ctrl | Data |
| RUN | 05 | begin execution | 1 | (1) | (2) | no | yes | yes | no |
| RSET | 11 | micro halt & reset | 0 | | | yes | yes | yes | no |
| HALT | 13 | HOL halt | 0 | | | yes | no | yes | no |
| IOCF | 08 | configure port | 1 | | | yes | yes | yes | no |
| PORT | 12 | select CP | 0 | | | no | yes | yes | no |

Note (1) If the control port is serial, the INTR_RQ_L signal goes active and the CE# must read status (RSTA) to interpret interrupt.
Note (2) If the control port is parallel, the INTR EXF is sent with 2 data words to the CE.

Note (1) If the control port is serial, the INTR_RQ_L signal goes active and the CE# must read status (RSTA) to interpret interrupt.

Note (2) If the control port is parallel, the INTR EXF is sent with 2 data words to the CE.

TABLE 3b

| | | | Data Transfer EXFs | | | | | | |
|---|---|---|---|---|---|---|---|---|---|
| | | | Data | Reply | Reply | State | | Port | |
| Name | Code | Description | Words | Type | Words | Run | Halt | Ctrl | Data |
| LDAT | 40 | send data | var. | | | yes | no | yes | yes |
| MAIL | 41 | send mail | var. | | | yes | no | yes | yes |
| CDAT | 7E | CE reply data | var. | | | yes | yes | yes | no |
| INTR | 7F | send interrupt (1) | 2 | | | yes | yes | yes | no |

Note (1) INTR can only be sent over a parallel control port from the signal processor to the arithmetic control element.

Note (1) INTR can only be sent over a parallel control port from the signal processor to the arithmetic control element.

TABLE 3c

| | | | Register EXFs | | | | | | |
|---|---|---|---|---|---|---|---|---|---|
| | | | Data | Reply | Reply | State | | Port | |
| Name | Code | Description | Words | Type | Words | Run | Halt | Crtl | Data |
| LMBP | 06 | load MS breakpoint | 1 | | | no | yes | yes | no |
| LDBP | 07 | load DS/CS breakpt | 2 | | | no | yes | yes | no |
| RSTA | 31 | read status | 0 | CDAT | 2 | yes | yes | yes | no |
| RMPC | 23 | read MPC | 0 | CDAT | 1 | no | yes | yes | no |
| RCSC | 33 | read CSAC/CP | 0 | CDAT | 1 | no | yes | yes | no |
| RDSC | 36 | read DSAC/DSSR | 0 | CDAT | 1 | no | yes | yes | no |
| RBMK | 34 | read MS breakpt | 0 | CDAT | 1 | no | yes | yes | no |
| RDBK | 35 | read DS/CS breakpt | 0 | CDAT | 2 | no | yes | yes | no |
| LMSC | 21 | load MS control | 2 | | | no | yes | yes | no |
| LCSC | 22 | load CS control | 2 | | | no | yes | yes | no |

TABLE 3c-continued

| Name | Code | Description | Register EXFs | | | State | | Port | |
| | | | Data Words | Reply Type | Reply Words | Run | Halt | Ctrl | Data |
| --- | --- | --- | --- | --- | --- | --- | --- | --- | --- |
| LDC0 | 23 | load DS0 control | 2 | | | no | yes | yes | no |
| LDC1 | 24 | load DS1 control | 2 | | | no | yes | yes | no |
| RCMS | 5B | read MS control | 1 | CDAT | 1 | no | yes | yes | no |
| RCCS | 5C | read CS control | 1 | CDAT | 1 | no | yes | yes | no |
| RCD0 | 5D | read DS0 control | 1 | CDAT | 1 | no | yes | yes | no |
| RCD1 | 5E | read DS1 control | 1 | CDAT | 1 | no | yes | yes | no |

TABLE 3d

| Name | Code | Description | Test EXFs | | | State | | Port | |
| | | | Data Words | Reply Type | Reply Words | Run | Halt | Ctrl | Data |
| --- | --- | --- | --- | --- | --- | --- | --- | --- | --- |
| SCNL | 09 | scan in long path | var. | | | no | yes | yes | no |
| SCNS | 0A | scan in short path | var. | | | no | yes | yes | no |
| TEST | 61 | begin test | 1. | | | no | yes | yes | no |
| SOUT | 7A | scan out | 1 | CDAT | var. | no | yes | yes | no |
| WTMS | 62 | write test MS | 2 | | | no | yes | yes | no |
| WTCS | 63 | write test CS | 3 | | | no | yes | yes | no |
| WTD0 | 64 | write test D0 | 3 | | | no | yes | yes | no |
| WTD1 | 65 | write test D1 | 3 | | | no | yes | yes | no |
| RTMS | 66 | read test MS | 2 | CDAT | 1 | no | yes | yes | no |
| RTCS | 67 | read test CS | 3 | CDAT | 1 | no | yes | yes | no |
| RTD0 | 68 | read test D0 | 3 | CDAT | 1 | no | yes | yes | no |
| RTD1 | 69 | read test D1 | 3 | CDAT | 1 | no | yes | yes | no |

Figure 4:
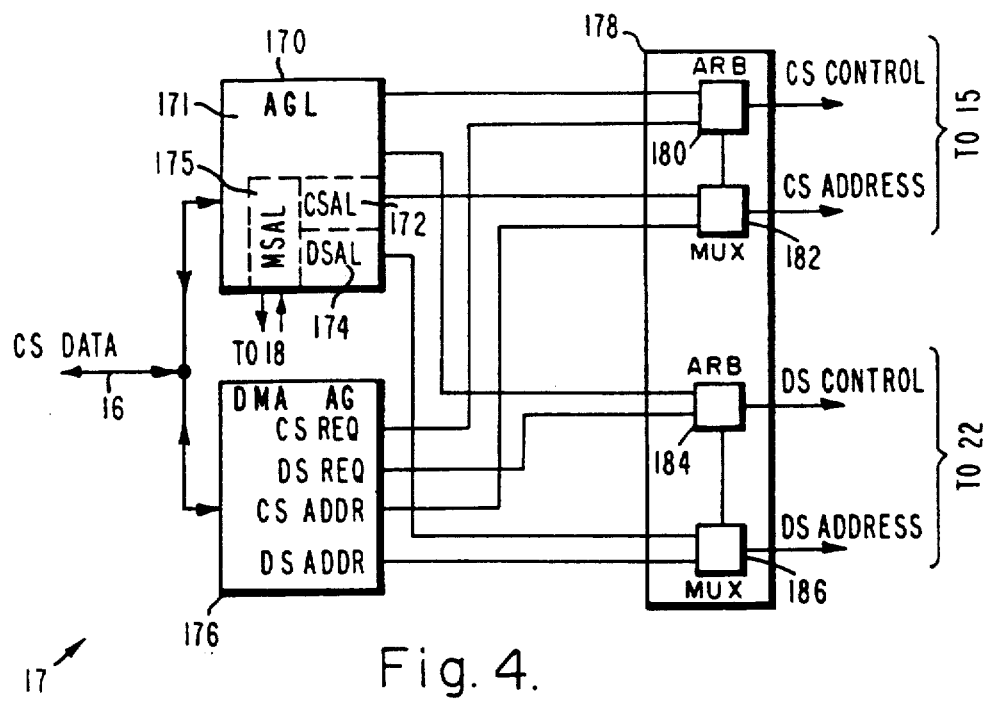
FIG. 4 is a diagram of an arithmetic element controller for use in the signal processor of FIG. 1.

FIG. 4 is a diagram of the arithmetic element controller 17 of FIG. 1. The arithmetic element controller 17 includes a first address generator 170 which comprises four address generator logic circuits, including a general purpose address generator logic circuit 171, and control store memory address logic 172, data store memory address logic 174 and micro store memory address logic 175. The first address generator 170 is coupled to the control store memory 15 by way of the control store bus 16.

The control store memory 15 is also coupled to a second address generator 176 which comprises control store and a data store address generators which will be more fully described below. The two address generators of the second address generator 176 will hereinafter be designated as control store address generator 176a and data store address generator 176b, respectively. The control store address generator 176a and data store address generator 176b are also coupled to the external interface unit 11 and control store memory 15.

Outputs from the first address generator 170, including the general purpose address logic circuit 171, control store address logic circuit 172, data store address logic circuit 174, and outputs from the second address generator 176, including the control store address generator 176a and data store address generator 176b are coupled to inputs of a memory access controller 178. As shown in FIG. 4, the memory access controller 178 is comprised of control store and data store arbitration circuits. The control store arbitration circuit comprises arbitration logic 180 and a multiplexer 182, and the data store arbitration circuit is substantially identical and comprises arbitration logic 184 and a multiplexer 186. Outputs from the respective address generator circuits are respectively coupled to the memory access controller 178 such that control store request lines are coupled to the control store arbitration logic 180 while the data store request lines are coupled to the data store arbitration logic 184, and the corresponding control store and data store address lines are coupled to corresponding control store multiplexer 182 and data store multiplexer 186.

Figure 5A:
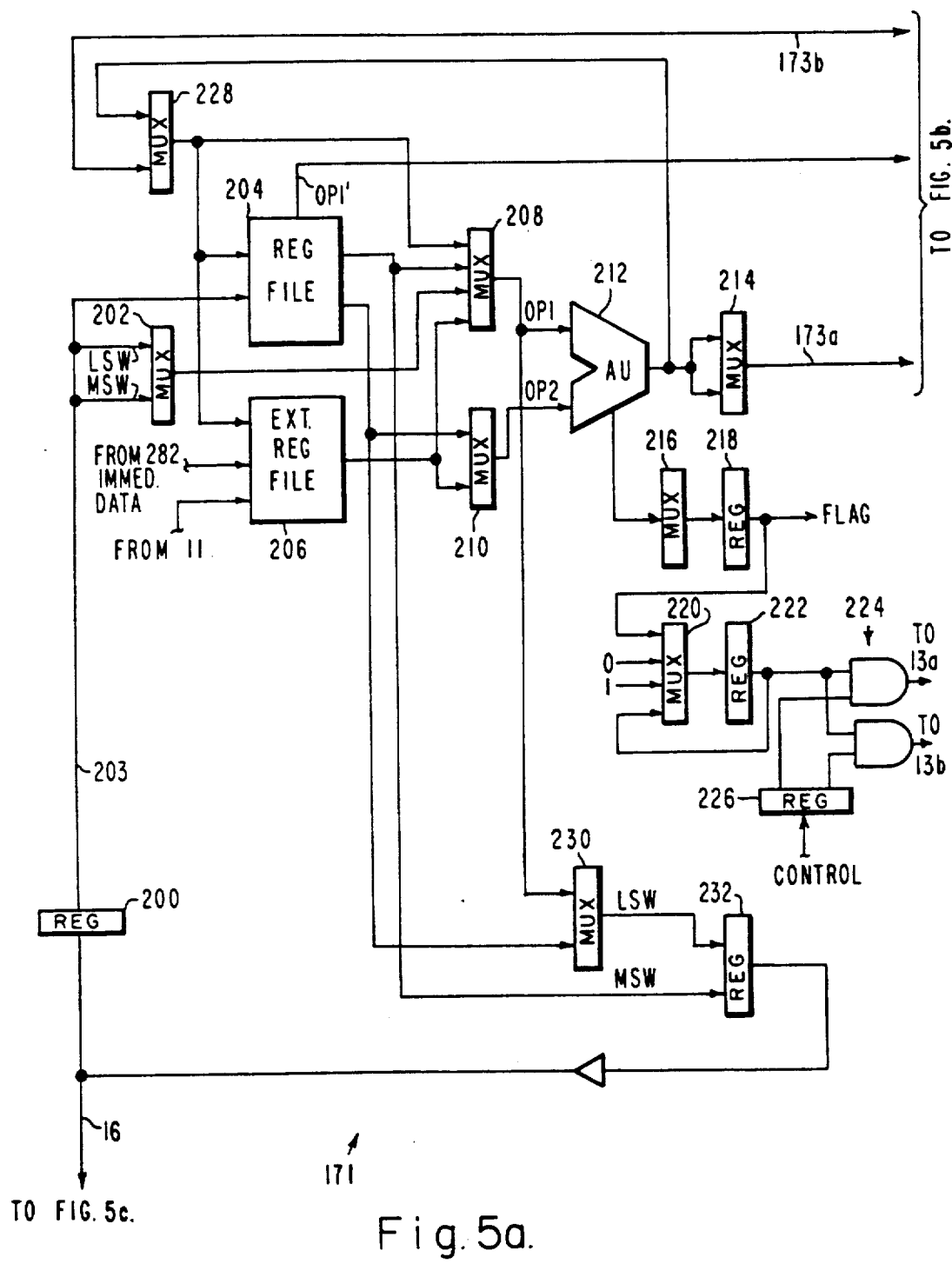
Figure 5B:
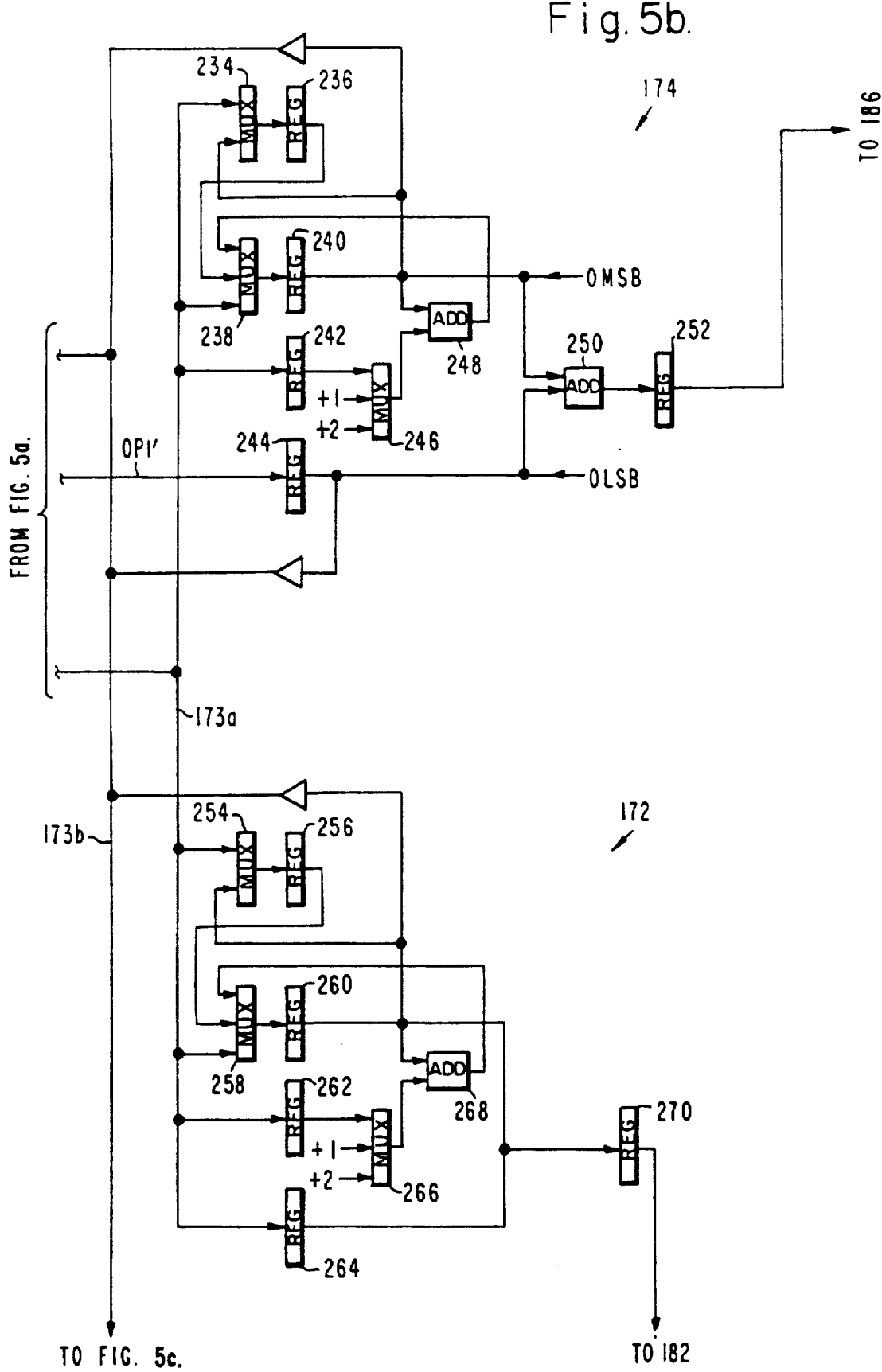

FIGS. 5a–c show detailed data flow diagrams for the address generator 170, control store address logic 172 and data store address logic 174, and micro store address logic 175, respectively. With reference to FIG. 5a, the address generator 170 comprises an input register 200 which interfaces to the control store bus 16. A first two-input multiplexer 202 is coupled between an input bus 203 and a four-input multiplexer 208. The input bus 203 is also coupled to a register file 204 whose first output is coupled to the four-input multiplexer 208 and to an output multiplexer 232. The second output of the register file 204 is coupled to a second two-input multiplexer 230. Outputs of the four-input multiplexer 208 and third two-input multiplexer 210 are coupled to an arithmetic unit 212, whose output is coupled by way of a fourth two-input multiplexer 214 to the data and control store address logic 176a, 176b. The multiplexer 214 is adapted to select normal or bit reversed addressing. In addition, the output of the arithmetic unit 212 is fed back to a fifth two-input multiplexer 228 which provides inputs to the register file 204 and to an extended register file 206. The output of the extended register file 206 is coupled to the second input of the third two-input multiplexer 210, whose output is coupled to the second input of the arithmetic unit 212.

A register 218 is employed as a flag to control conditional operations. Multiplexer 216 is adapted to select one of four flag outputs from the arithmetic unit 212, including carry output (CO), less than zero (LT), equal to zero (EO) and greater than zero (GT). Conditional arithmetic unit operations are executed on true (TR) or false (FA) state of the flag. Two AND gates 224, generate write enable signals for the data store memories 13a, 13b. The write enable signals may be individually controlled by way of register 226 or controlled as a group by way of register 222. Register 222 may be set, cleared, its current value held, or loaded from the above-described flag in accordance with selection provided by the multiplexer 220.

Referring to FIG. 5b, the control store address logic 172 and data store address logic 174 are shown. Each of these circuits is substantially similar to the other except for an additional adder in the data store address logic 174. For purposes of description, the data store address logic 174 comprises two input multiplexers 234, 238, whose inputs are provided by the arithmetic unit 212 of FIG. 5a. The output from the first two-input multiplexer 234 is coupled by way of a register 236 to an input of the second two-input multiplexer 238. The output of the second two-input multiplexer 238 is coupled by way of a register 240 to an input of an adder 250. A plurality of zeros are added to this portion of the word indicated by the 0 MSB input line. A 16 bit word provided by the register 240 is combined with 5 bits from the 0 MSB line to generate a 21 bit memory word. This provides the ability to address a larger memory space. The remaining input of the three-input multiplexer 238 is provided by way of a three-input multiplexer 246 from the output of a second adder 248.

The register file 204 provides an output by way of a register 244 to a second input of the adder 250 whose output is coupled by way of a register 252 to the data store memory 13. A plurality of zeros are again combined with the output of the register file 204 to provide a 21 bit word employing the 0 LSB input line. The second adder has its second input coupled to the arithmetic unit 212 by way of a three input multiplexer 246.

FIG. 5c shows the micro store address generator logic circuit 175 which is employed to access the micro store memory 18. The construction details of the micro store address generator logic circuit 175 are self evident from FIG. 5c and will not be discussed in detail. In operation, the micro store address generator logic circuit 175 has three modes of operation, including jump, step and branch. The jump mode is used to start execution of a micro store primitive routine. The starting address of the routine is stored in the control store memory 15. The jump mode is executed by reading the start address from the control store memory 15 over the control store bus 16, by way of the multiplexer 274 and into registers 276 and 278. The step mode is executed by incrementing the contents of register 276. The branch mode is executed by using adder 272 to add an offset value from the micro instruction to the current contents of register 274. Registers 278, 282 and 284 are delay registers which provide the desired signal timing.

In general, the address generator 170 of FIG. 4 operates as follows. The arithmetic unit 212 is used to provide address and control calculations. The register file 204 is used to store intermediate values. The extended register file 206 is used to store the status of input and output transfers from the interface unit 11, immediate data from the micro store memory 18, and program control values. The multiplexers 208, 210 allow the selection of various input sources for the arithmetic unit 212. The multiplexer 228 is used to select the output of the arithmetic unit 212 or the output of one of the address registers to load the register files. The register 232 and multiplexer 230 are used to format data to be written back to the control store memory 15.

Figure 6:
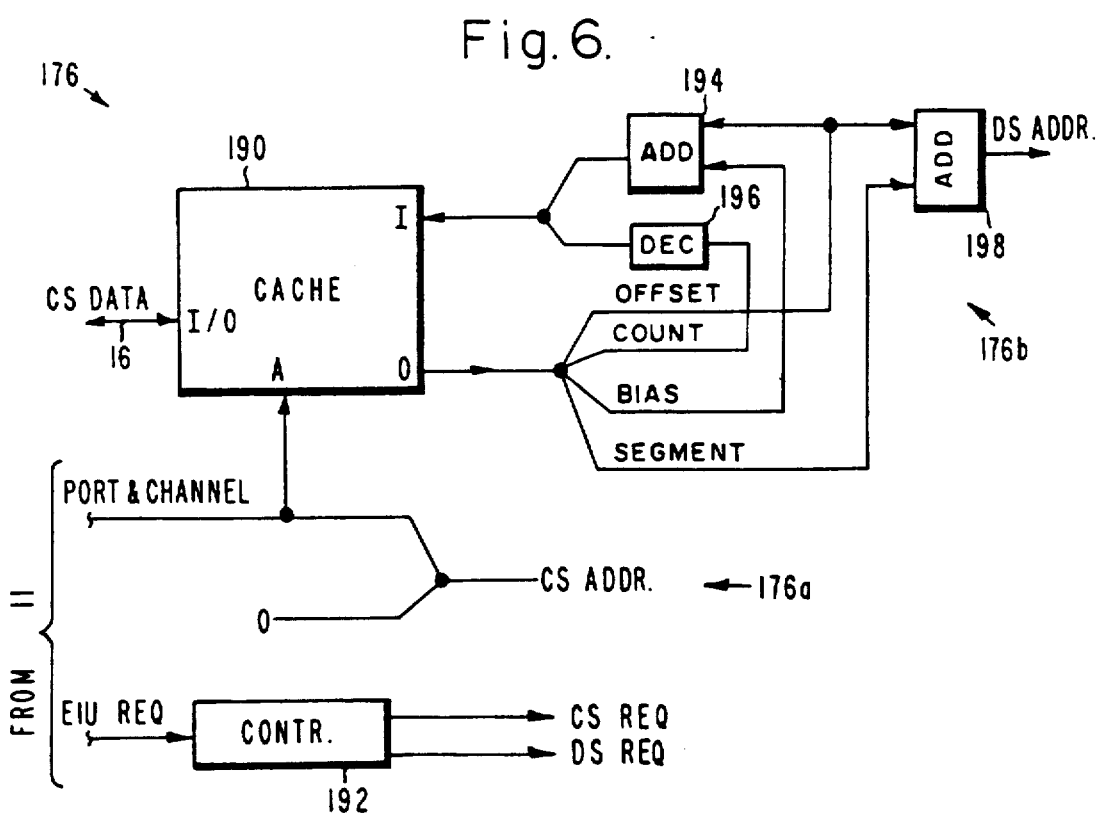
FIG. 6 is a diagram illustrating the circuits comprising the second address generator of the arithmetic element controller of FIG. 4.

With reference to FIG. 6, it shows a diagram illustrating the second address generator 176 comprising its two address generators 176a, 176b. In particular, the address generator 176a comprises a cache memory 190 having an input coupled to the control store bus 16 and which receives control store data thereover. An output of the cache memory 190 comprises offset, count bias and segment data signals of which the offset and segment signals are coupled to an output adder 198 which in turn is coupled to the data store memory 13. The bias and offset signals are coupled to a second adder 194 which is employed to combine the signals and overwrite the cache memory 190 with new address information. The decrement logic 196 uses the count signal to count the number of words that are to be transferred to or from the data store memory 13 during a transfer.

In addition a controller 192 is provided which is coupled to the external interface unit 11 and provides control store and data store request signals. Port and channel signals are also provided by the external interface unit 11 which are coupled with 0 to produce control store addresses and which are used to address the cache memory 190. as shown.

The controller 192 accepts memory requests from the external interface unit 11 and generates control store and data store memory requests therefrom. Parallel port and channel information identifying the specific data port (A,B, C,D) over which transmission is occurring and the specific channel (1 to 16) which is supported by the external interface unit 11 is provided to the cache memory 190 and a control store memory address is provided.

The control store and data store requests and control store addresses are used to read parameters stored in the cache memory 190 from which are generated data store memory addresses. The parameters include offset, word count, bias and segment data. The offset and segment data is combined to generate the data store memory addresses in a conventional manner. The bias and offset data are combined to generate a new offset which is stored in the cache memory 190. The count data is decremented and stored in the cache memory 190.

With reference again to FIG. 5a, the extended register file includes a program counter (PC), an executive pointer (EP), condition flag (CF), mail mask (MM), mail flags (MF), trap mask (TM) and micro store counter (MPC) registers. In addition, the control store memory has a memory allocation scheme such that I/O parameters, including the offset, count bias and segment parameters for each channel are stored in low memory, while above this section is an executive buffer and then the application program occupies the balance of the memory space. The micro store memory stores primitives which are employed by the arithmetic element controller 17.

Figure 7:
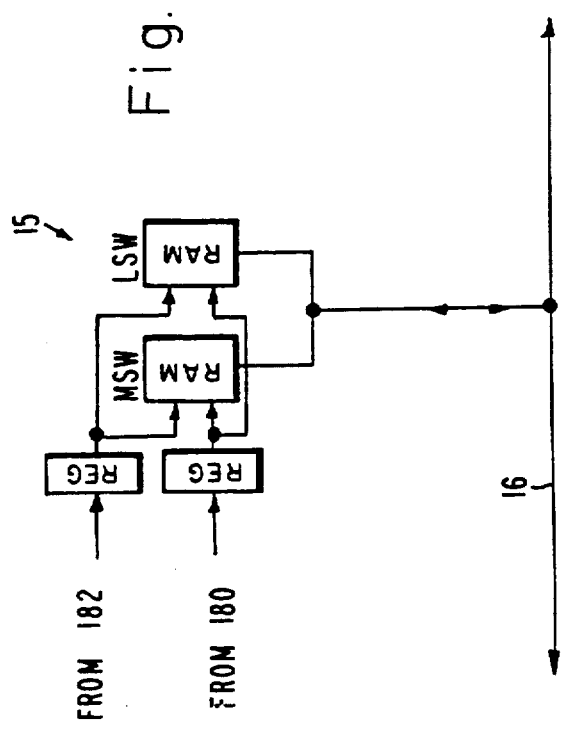
FIG. 7 is a diagram illustrating a control store memory for use in the signal processor of FIG. 1.

FIG. 7 illustrates the control store memory 15 which is comprised of two random access memory portions which store the least and most significant portions of the words stored therein. The control store memory 15 is coupled to the control store address logic 172 via the control store address multiplexer 182 and control signals are provided thereto from the arbitration logic 180.

Figure 8:
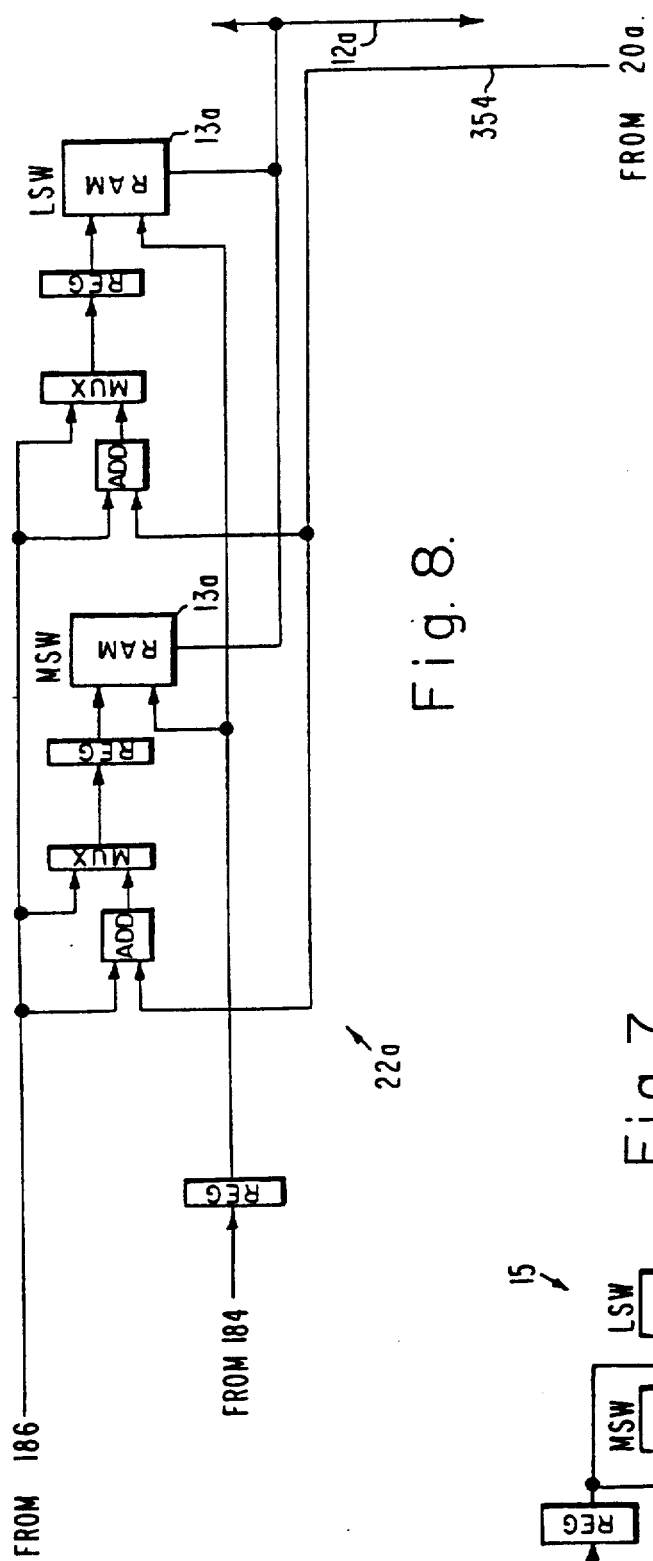
FIG. 8 is a diagram illustrating a data store interface logic and data store memory for use in the signal processor of FIG. 1.

FIG. 8 illustrates the data store interface logic 22a along with the interface of this logic to the data store memory 13a. The data store memory 13a is also comprised of two random access memory portions which store the least and most significant portions of the words stored therein. The balance of the logic comprising the data store index logic 22a is clear from FIG. 8 and will not be described in detail. Addresses are coupled to the data store index logic 22a by way of register 252 in the data store address logic 174 via the data store address multiplexer 186, and control signals are provided thereto from the arbitration logic 184.

No control lines or logic have been shown in the drawing for the arithmetic element controller 17. However, Table 4 below shows the 64 bit microcode word having opcode mnemonics identified therein wherein bits 36-63, are employed by the arithmetic element controller 17. The abbreviations used in Table 4 are as follows: MOD is the modifier field; OPER is the operator field; OP1 and OP2 are generic operands which represent busses, register, or immediate data and control; CR is the CS address field; DR is the DS address field; CS is the CS access field; and DS is the DS access field.

TABLE 4

| Unit | Bits | Field | Comment |
|---|---|---|---|
| Address | 63-60 | MOD | |
| Generator | 59-57 | OPER | |
| | 56-53 | OP1 | Data/Offset |
| | 52-49 | OP2 | Data/Offset |
| | 48-46 | CR | |
| | 45-43 | DR | |
| Memory access | 42-39 | CS | |
| | 38-36 | DS | |
| Multiplier | 35-34 | A | Status/Mode Register (SMR) |
| | 33-31 | B | SMR |
| | 30-28 | MOP | SMR |
| RALU | 27-26 | I | SMR |
| | 25 | FLG | SMR |
| | 24-21 | MD | SMR |
| | 20-15 | RPO | SMR |
| | 14-10 | A | SMR |
| | 9-5 | B | SMR |
| | 4 | S | SMR |
| | 3-2 | DE | Reserved |
| | 1, 0 | Fl, | Reserved |
| | | FO | |

Table 5a lists the operands for the address generator. The operands may be registers, bus contents or immediate data and control values, as listed below. Table 5b lists the modifiers for the address generator. The modifiers specify auxiliary operations which are performed in conjunction with address generator operator functions.

TABLE 5a

| Address Generator Operands | |
|---|---|
| Operand | Description |
| Ai | General purpose register, i = 0 to 15 decimal |
| Bj | General purpose register, j = 0 to 15 decimal |
| PC | Program counter register |
| EP | Executive pointer register |
| CC | Control store address counter |
| DC | Data store address counter |
| SR | Data store segment register |
| CS | Least significant word of control store bus, read only |
| CL | Most significant and least significant words of control store bus, read only |
| MC | Micro program counter |
| TM | Trap mask register |
| MM | Mail mask register |
| MF | Mail flags register |
| CR | Condition flags register |
| CP | Control store page register |
| ID | Immediate data register |
| −128:255 | Decimal number (1 or 2 operands) |
| X'00':X'FF' | Hexadecimal number |
| <label> | Seven character alphanumeric label |
| <smr> | Mnemonics which specify status mode register |

TABLE 5b

| Address Generator Modifiers | | |
|---|---|---|
| Modifier | Definition | Description |
| NO | No modification | No modification of operator |
| LT | AGFLG:=1\|0(bus 16<0) | Set AGFLG if bus 16 is less than 0, else clear AGFLG |
| EQ | AGFLG:=1\|0(bus 16<=0) | Set AGFLG if bus 16=0, else clear AGFLG |
| GT | AGFLG:=1\|0(bus 16>0) | Set AGFLG if bus 16 is greater than 0, else clear AGFLG |
| CO | AGFLG:=1\|0(carry) | Set AGFLG if carry occurs, else clear AGFLG |
| EW | DSWEN:=1 | Set data store write enable flag |
| DW | DSWEN:=0 | Clear data store write enable flag |
| CE# | DSWEN:=AGFLG | Set data store write enable flag to AGFLG |
| TR | op\|nop(AGFLG) | Do operation if AGFLG=1, else do default operation |
| FA | nop\|op(AGFLG) | Do operation if AGFLG=0, else do default operation |
| BR | bus 16=br(bus 16) | Select bit reverse input on mux 214 |
| BS | bus 16=br(bus 16), register 244:=op1' | Select bit reverse input on mux 214 and load register 214 from register op1' |
| LS | register 244=op1' | Load register 244 from register op1' |
| ML | op\|nop(MM and MF) | Do operation based on (MM and MF) |
| CS | register 276:=LSW(bus 16) | Load register 276 from least significant word of bus 16 |
| EX | register 276:=0 | Load register 276 with zero |

Tables 6a through 6l show the valid combinations of modifiers, operators and operands which may be combined to move data between the source and destination files, as indicated. Any modifier in the first column may be combined with any operator listed in the second column, and so on for the two OP columns.

TABLE 6a

| Arithmetic Element Controller Instructions Register file (source) to register file (destination) | | | | |
|---|---|---|---|---|
| Modifier msdata<60:63> | | Operator msdata<57:59> | OP1 msdata<53:56> | OP2 msdata <49:52> |
| NO | 0 | MOV 0 | AGi 0:15 | AGi 0:15 |
| CE | 1 | NEG 1 | | |
| DW | 2 | INC 2 | | |
| EW | 3 | DEC 3 | | |
| CO | 4 | ADD 4 | | |
| LT | 5 | SUB 5 | | |
| EQ | 6 | OAD 6 | | |
| GT | 7 | DSU 7 | 6FA | 8 |
| TR | 9 | | | |
| LS | A | | | |
| BR | B | MOV 1 | AGi 0:15 | AGi 0:15 |

TABLE 6a-continued

Arithmetic Element Controller Instructions
Register file (source) to register file (destination)

| Modifier msdata<60:63> | Operator msdata<57:59> | OP1 msdata<53:56> | | OP2 msdata <49:52> | |
|---|---|---|---|---|---|
| | | ADD | 3 | | |
| BS B | MOV | 0 | | AGi 0:15 | AGi 0:15 |
| | | ADD | 2 | | |

TABLE 6b

Arithmetic Element Controller Instructions
Register file (source) to extended register file (destination)

| Modifier msdata<60:63> | Operator msdata<57:59> | OP1 msdata<53:56> | | OP2 msdata <49:52> | |
|---|---|---|---|---|---|
| NO E | MOV | 0 | AGi 0:15 | MM | 8 |
| | NEG | 1 | | MF | 9 |
| | INC | 2 | | CF | A |
| | DEC | 71PC 3 | | PC | D |
| | ADD | 4 | | EP | E |
| | SUB | 5 | | TM | F |
| | OAD | 6 | | | |
| | OSU | 7 | | | |
| NO F | MOV | 5 | AGi 0:15 | CP | 8 |
| | | | | DI | 9 |
| | | | | CI | A |

TABLE 6c

Arithmetic Element Controller Instructions
Extended register file (source) to register file (destination)

| Modifier msdata<60:63> | Operator msdata<57:59> | OP1 msdata<53:56> | | OP2 msdata <49:52> |
|---|---|---|---|---|
| NO C | MOV | 0 | DC 0 | AGj 0:15 |
| | | | CC 1 | |
| | | | MC 2 | |
| | | | CS 3 | |
| | | | SR 4 | |
| | | | CP 5 | |
| | | | MM 8 | |
| | | | MF 9 | |
| | | | CF A | |
| | | | ID C | |
| | | | PC D | |
| | | | EP E | |
| | | | TM F | |

TABLE 6d

Arithmetic Element Controller Instructions
Extended register file (source) to extended register file (destination)

| Modifier msdata<60:63> | Operator msdata<57:59> | OP1 msdata<53:56> | | OP2 msdata <49:52> | |
|---|---|---|---|---|---|
| NO F | MOV | 0 | DC 0 | mm | 8 |
| | NEG | 1 | CC 1 | MF | 9 |
| | INC | 2 | MC 2 | CF | A |
| | DEC | 3 | CS 3 | PC | D |
| | | | SR 4 | EP | E |
| | | | CP 5 | TM | F |
| | | | MM 8 | | |
| | | | MF 9 | | |
| | | | CF A | | |
| | | | ID C | | |
| | | | PC D | | |
| | | | EP E | | |
| | | | TM F | | |

TABLE 6e

Arithmetic Element Controller Instructions
Control store long word (source) to register file (destination)

TABLE 6e-continued

| Modifier msdata<60:63> | Operator msdata<57:59> | OP1 msdata<53:56> | | OP2 msdata <49:52> |
|---|---|---|---|---|
| NO B | MOV | 4 | CL 7 | AGj 0:15 |

TABLE 6f

Arithmetic Element Controller Instructions
Register file (source) to register file (destination)

| Modifier msdata<60:63> | Operator msdata<57:59> | OP1 msdata<53:56> | OP2 msdata <49:52> |
|---|---|---|---|
| NO B | AND 5 | AGi 0:15 | AGj 0:15 |
| | NOT 6 | | |

TABLE 6g

Arithmetic Element Controller Instructions
Immediate data loads

| Modifier msdata<60:63> | Operator msdata<57:59> | OP1 msdata<53:56> | OP2 msdata <49:52> |
|---|---|---|---|
| NO F | LIL 6 | | 8 bit data |
| NO F | LIM 7 | | 8 bit data |

TABLE 6h

Arithmetic Element Controller Instructions
Bit operands

| Modifier msdata<60:63> | Operator msdata<57:59> | OP1 msdata<53:56> | OP2 msdata <49:52> |
|---|---|---|---|
| NO D | SAV 0 | AGi 0:15 | AGj 0:15 |
| | TST 1 | | |
| | CLR 2 | | |
| | SET 3 | | |

TABLE 6i

Arithmetic Element Controller Instructions
Register file (source) to register file (destination) shift operations

| Modifier msdata<60:63> | Operator msdata<57:59> | OP1 msdata<53:56> | OP2 msdata <49:52> |
|---|---|---|---|
| NO D | SRA 4 | AGi 0:15 | AGj 0:15 |
| | 6 | | |
| | 6 | | |
| | 7 | | |

TABLE 6j

Arithmetic Element Controller Instructions
Register file or extended register file (source) to control store (destination)

| Modifier msdata<60:63> | Operator msdata<57:59> | OP1 msdata<53:56> | | OP2 msdata <49:52> |
|---|---|---|---|---|
| NO F | OUT | 4 | Agi 0:15 | AGj 0:15 |
| NO B | OUT | 7 | CD 0 | x |
| | | | CC 1 | |
| | | | MC 2 | |
| | | | CS 3 | |
| | | | SR 4 | |
| | | | CP 5 | |
| | | | MM 8 | |
| | | | MF 9 | |
| | | | CF A | |
| | | | ID C | |
| | | | PC D | |
| | | | EP E | |
| | | | TM F | |

TABLE 6k

Arithmetic Element Controller Instructions
Jump and branch instructions

| Modifier msdata<60:63> | Operator msdata<57:59> | OP1 msdata<53:56> | OP2 msdata <49:52> |
|---|---|---|---|
| CS C | JMP 1 | x | x |
| EX C | JMP 2 | x | x |
| NO C | JMP 3 | 8 bit relative offset | |
| ML C | JMP 4 | 8 bit relative offset | |
| TR C | JMP 5 | 8 bit relative offset | |
| FA C | JMP 6 | 8 bit relative offset | |

TABLE 6l

Arithmetic Element Controller Instructions
Initialize and data store write enable operations

| Modifier msdata<60:63> | Operator msdata<57:59> | OP1 msdata <53:56> | | OP2 msdata<49:52> | |
|---|---|---|---|---|---|
| NO C | INT | 7 | AGi 0:15 | AGj | 0:15 |
| NO F | DSE | 5 | DS1 0:1 | DS0 | 0:1 |

Tables 7a through 7d describe the operation code mnemonics for the arithmetic element controller 17.

TABLE 7a

OP Code Mnemonics

| Mnemonic | CR Field | Description |
|---|---|---|
| H | 0 | No operation |
| LC | 1 | Load register 260 from bus 173a |
| LR | 2 | Load register 256 from bus 173a |
| X | 3 | Exchange contents of register 260 and register 256 |
| +1,+2 | 4 | Increment register 260 by one or two according to access |
| +1 | 5 | Increment register 260 by register 262 |
| 1x,2x | 6 | Increment register 260 by one or two according to access and exchange contents of register 260 and register 256 |
| IX | 7 | Increment register 260 by register 262 and exchange contents of register 260 and register 256 |

TABLE 7b

OP Code Mnemonics

| Mnemonic | DR Field | Description |
|---|---|---|
| H | 0 | No operation |
| LC | 1 | Load register 240 from bus 173a |
| LR | 2 | Load register 236 from bus 173a |
| X | 3 | Exchange register 240 and register 236 |
| +1,+2 | 4 | Increment register 240 by one or two according to access |
| +1 | 5 | Increment register 240 by register 242 |
| 1x,2x | 6 | Increment register 240 by one or two according to access and exchange register 240 and register 236 |
| IX | 7 | Increment register 260 by register 262 and exchange register 240 and register 236 |

TABLE 7c

OP Code Mnemonics

| Mnemonic | CS Field | Description |
|---|---|---|
| NS | 0 | No operation |
| NL | 1 | No operation |
| LR | 2 | Enable output register 214 onto the control store bus 16 |
| ENA | 3 | Enable output register 214 onto the control store bus 16 |
| ES0 | 4 | Enable Status Mode Register from 14a, 20a |
| EN0 | 5 | Enable RALU 20a |
| ES1 | 6 | Enable Status Mode Register from 14b, 20b |
| EN1 | 7 | Enable RALU 20b |
| RS | 8 | Read control store memory 15 short word |
| RL | 9 | Read control store memory 15 long word |
| WSA | A | Write control store memory 15 short word from controller 17 |
| WLA | B | Write control store memory 15 long word from controller 17 |
| WS0 | C | Write control store memory 15 short word from RALU 20a |
| WL0 | D | Write control store memory 15 long word from RALU 20a |
| WS1 | E | Write control store memory 15 short word from RALU 20b |
| WL1 | F | Write control store memory 15 long word from RALU 20b |

TABLE 7d

OP Code Mnemonics

| Mnemonic | DS Field | Description |
|---|---|---|
| NS | 0 | No operation |
| NL | 1 | No operation |
| ES | 2 | Send RALU 20a output to interface 11 |
| EL | 3 | Read interface 11 status word into RALU 20a |
| RS | 4 | Read data store memory 13 short word |
| RL | 5 | Read data store memory 13 long word |
| WS | 6 | Write data store memory 13 short word |
| WL | 7 | Write data store memory 13 long word |

The operation code mnemonics for the external interface unit 11 are provided in Tables 8a and 8b.

TABLE 8a

OP Code Mnemonics

| eiuc<8:9> | MODE | Description |
|---|---|---|
| 3 | Run | Both the address generator logic circuit 170 and the address generator 176 are running normally |
| 2 | Run/Hold | The address generator logic circuit 170 is halted while the address generator 176 is running normally |
| 1 | Halt | Both the address generator logic circuit 170 and the address generator 176 are halted, but enabled for built in test. |
| 0 | Halt/Hold | Both the address generator logic circuit 170 and the address generator 176 are halted. |

TABLE 8b

OP Code Mnemonics

| eiuc<0:7> | MODE | Description |
|---|---|---|
| 0 | NOOP | On operation |
| 1 | DSIN | Increment register 240 |
| 2 | LDS0 | Increment register 240, enable data store memory write |
| 3 | LDS1 | Increment register 240, enable data store memory write |
| 5 | LCSC | Load register 260 from register 262 <0:15> |
| 6 | LDSS | Load register 244 from register 262 <16:31> |
| 7 | LDSC | Load register 240 from register 262 <0:15> |
| 8 | TAEC | Transfer micro store word (bus 13a to bus 16) and load bus 16 into control store memory input register 262 |
| 9 | LDCS | Increment register 260, enable control store memory write |
| C | LMPC | Load register 276 from register 262 <0:15> |
| D | MSIN | Increment register 282 and enable micro |

TABLE 8b-continued

| eiuc<0:7> | MODE | Description |
|---|---|---|
| | | store memory read cycle |
| 10 | LDAE | Load micro store word, increment register 276, micro store write enable |
| 18 | WRMS | Enable micro store data word onto micro store bus |
| 21 | RMPC | Output register 276 data onto control store bus 16<0:15> |
| 23 | RCSC | Output register 260 data onto control store bus 16<0:15> |
| 24 | RDCS | Enable control store memory read cycle |
| 25 | RCSI | Enable control store memory read cycle, increment register 260 |
| 26 | RDSS | Output register 244 data onto control store bus 16<0:15> |
| 27 | RDSC | Output register 240 data onto control store bus 16<0:15> |
| 2A | OMPC | Reload register 276 from holding register |
| 2C | OCSC | Reload register 260 from holding register |
| 30 | RDAE | Enable micro store memory read cycle, transfer micro command register 282 data to control store bus 16<4:31> |
| 34 | RAEI | Enable micro store memory read cycle, transfer register 282 data to control store bus 16<4:31>, increment register 276 |
| 38 | RDAC | Enable micro store memory read cycle, transfer register 282 data to control store bus 16<4:31> |
| 3C | RACI | Enable micro store memory read cycle, transfer register 282 data to control store bus 16<4:31> |
| 42 | ODSC | Reload register 240 from holding register |
| 44 | RDDS | Enable data store memory read cycle |
| 45 | RDSI | Enable data store memory read cycle, increment register 240 |
| 48 | RESET | Reset (initialize) storage elements |

Figure 9A:
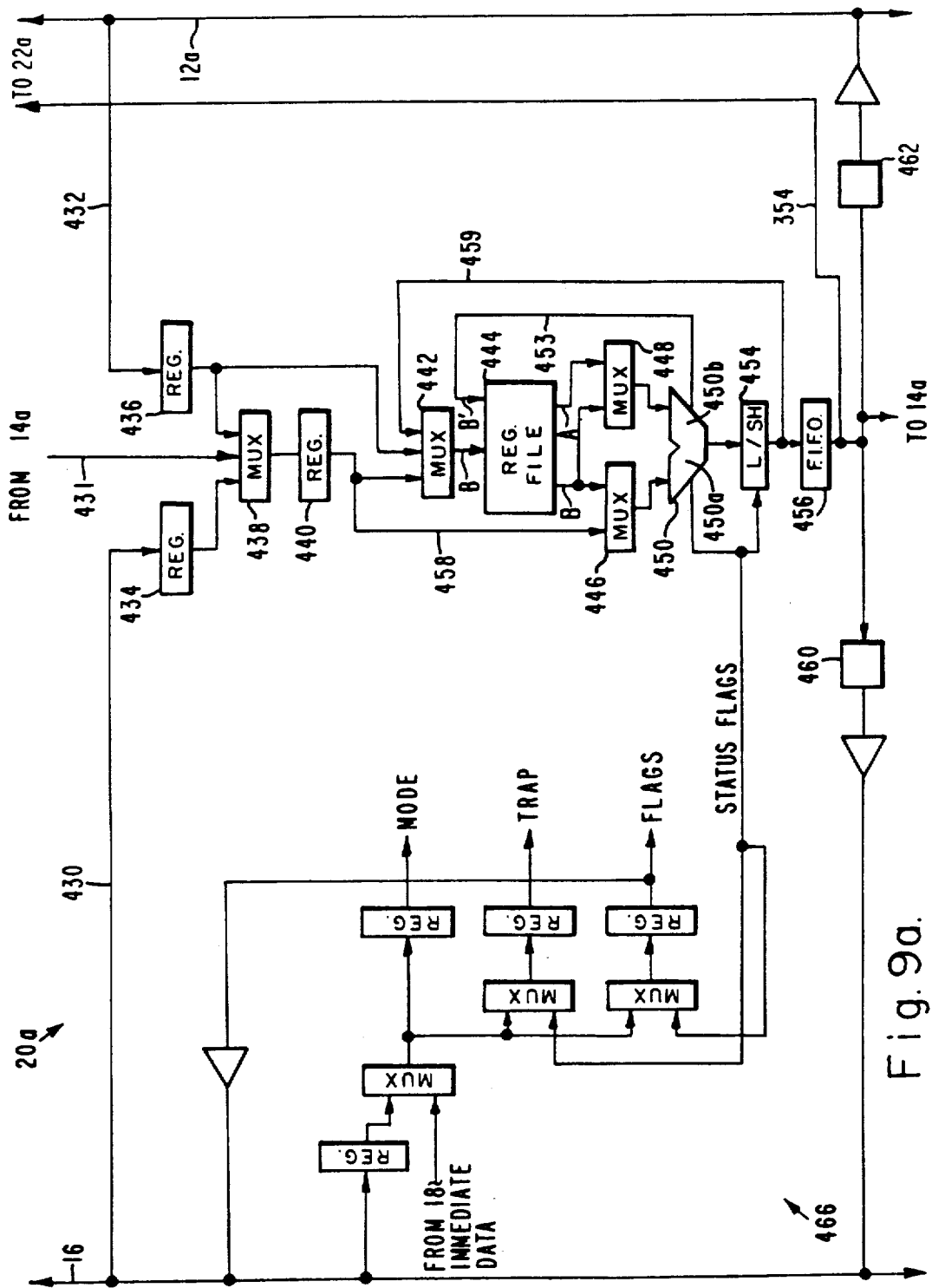
FIG. 9a is a diagram of a register and arithmetic logic unit for use in the signal processor of FIG. 1.

A detailed data flow diagram of the register and arithmetic logic unit 20a of the present invention is shown in FIG. 9. Shown therein are a plurality of data input lines to the register and arithmetic logic unit 20a comprising a control store input line 430, a multiplier input line 431 and a data store input line 432. The control store and data store input lines 430, 432 are separately coupled through control and data unpacking logic 434, 436 to a first three-input multiplexer 438. The first multiplexer 438 is coupled by way of a first register 440 to a second three-input multiplexer 442.

The second multiplexer 442 is coupled to a 32 bit by 32 word register file 444 which has two outputs A, B, that are coupled to two two-input multiplexers 446, 448, as shown. The first register 440 is also coupled to the first two input-multiplixer 446 by way of bypass path 458. The two input multiplexers 446, 448 are coupled to an arithmetic logic unit 450 which incorporates two parallel arithmetic logic units 450a, 450b that provide fixed point and floating point arithmetic processing operations, respectively.

The arithmetic logic unit 450 is coupled by way of a third two-input multiplexer 452 to limiter/shifter logic 454 and then to a four word first in, first out (FIFO) buffer 456. A first feedback loop 453 is provided between the arithmetic logic unit 450 and the register file 444, which loop is shown in more detail in FIG. 10. A second feedback loop 459 is provided from a point between the limiter/shifter logic 454 and the FIFO buffer 456 to the second three-input multiplexer to control the signal flow through the arithmetic logic unit 20a. The first in, first out buffer is coupled to respective control store and data store memories 15, 13 by way of respective buffered packing logic units 460, 462, and to the multiplier 14a and the data store interface logic (DSIL) 22 shown in FIGS. 1 and 8.

Control and timing logic 466 is provided which interfaces between the arithmetic logic unit 450 and the arithmetic element controller 17. This control and timing logic 466 provides status flags, conditional flags and other information to the controller as is identified in FIG. 9a. The control and timing logic 466 and its interconnection are clearly shown in FIG. 9a and will not be discussed in detail herein.

Figure 9B:
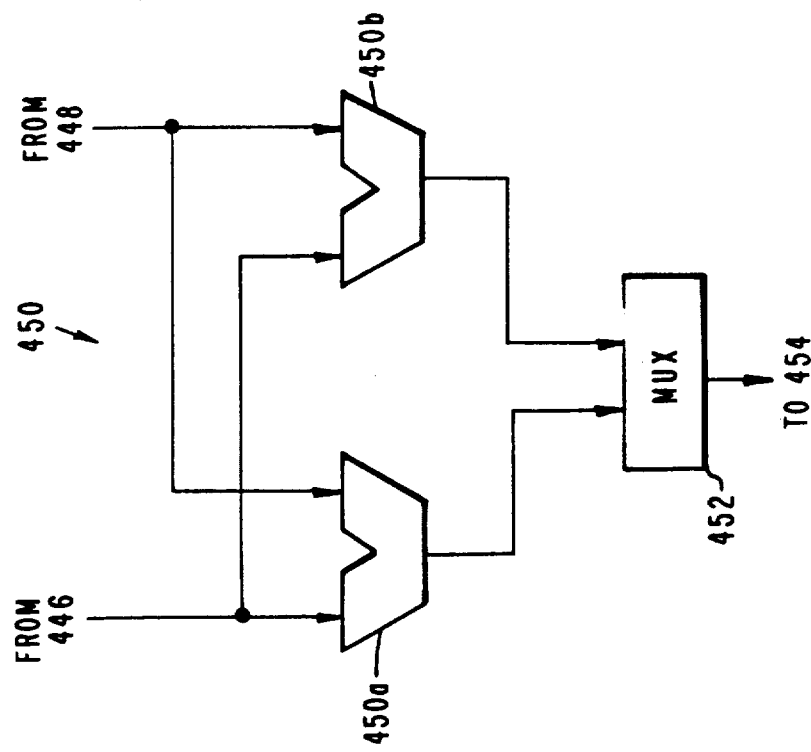

The processor 450 is comprised of two individual processors, namely the fixed point processor 450a and the floating point processor 450b. These two individual processors 450a, 450b have their outputs coupled by way of a third two-input multiplexer to the limiter/shifter logic circuit 452, as shown in FIG. 9b.

With reference to FIG. 10 it shows a more detailed diagram of the register file 444 and fixed and floating point processor 450 of the present invention. The fixed and floating point processor 450 comprises two 16 bit fixed point incrementers 470, 472 which receive output B' from the register file 444. Outputs of the two 16 bit fixed point incrementers 470, 472 are coupled together and provide a feedback path to the register file 444.

The output of the first two-input multiplexer 446 is coupled to one input of a 32 bit floating point arithmetic unit 474 and respective first inputs of two 16 bit fixed point arithmetic logic units 476, 478. The output of the second two-input multiplexer 446 is coupled to the second input of the 32 bit floating point arithmetic unit 474 and respective second inputs of the 16 bit fixed point arithmetic logic units 476, 478. An AND gate 480 and third and fourth two-input multiplexers 482, 484 interconnect the 16 bit fixed point arithmetic logic units 476, 478 and the two 16 it fixed point incrementers 470, 472 as shown. Outputs of the two 16 bit fixed point arithmetic logic units 476, 478 are coupled to one input of the two-input multiplexer 452, while the output of the 32 bit floating point arithmetic unit 474 is coupled to the second input of the two-input multiplexer 452.

The register and arithmetic unit 20a utilizes its register file 444 to store a plurality of data words. The arithmetic logic unit 20a processes data words by means of the two parallel arithmetic logic units that provide fixed point and floating point arithmetic processing operations, respectively. The interface logic selectively transfers data words to the register file 444 for storage therein or to the arithmetic logic means for processing thereby.

The register and arithmetic logic unit 20a incorporates a split pipeline architecture that is capable of simultaneously operating on multiple data formats. The data formats include dual 16 bit fixed point, 32 bit fixed point, 32 bit floating point and logical data processing formats. Post-processing registers include a limiter/shifter register, a length-select able four word first in, first out buffer that controls the length of the register pipeline, and logic which provides for queuing of the processed data words.

The register file 444 and the fixed point arithmetic logic unit may be selectively coupled together to function as an accumulator. This function permits processing of the data words such that two 32 bit data words are accumulated into a 64 bit data word comprising two register file words, or the dual 16 bit data words are accumulated into a 32 bit data word. Processing using the dual 16 bit format employs a potential overflow scheme which permits a variety of signal processing algorithms to function with relatively compact code.

Figure 11:
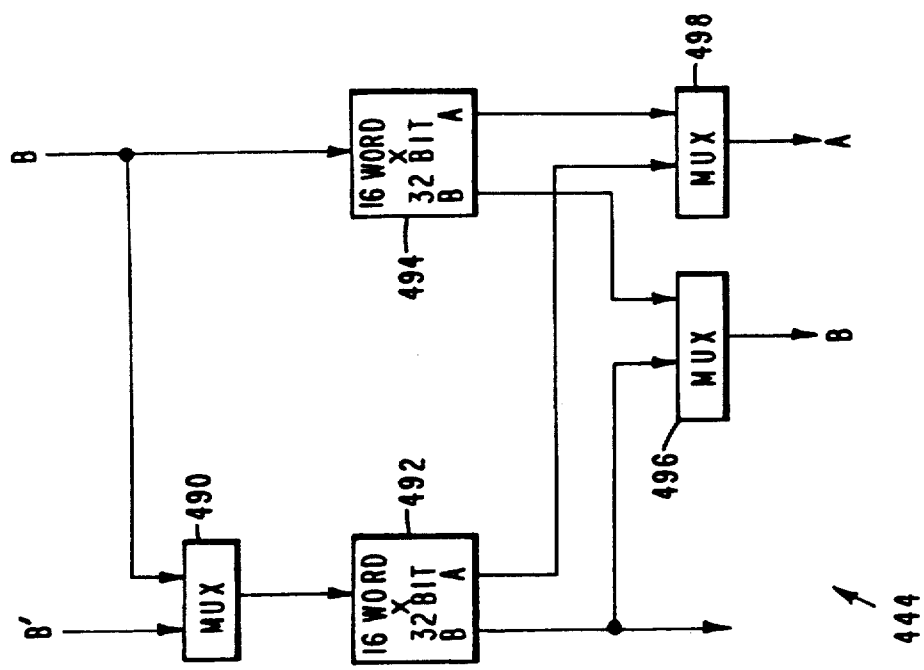

FIG. 11 shows a detailed diagram of the register file 444. The register file 444 includes an input multiplexer 490 which receives data inputs B and B', and two 16 word by 32 bit registers 492, 494. Outputs A and B of the two registers 492, 494 are coupled to each of the output multiplexers 496, 498 which combine the respective A and B data to form complete A and B words, while the B output of the first register file 444 provides the B' output.

No control lines or logic have been shown in the drawing for the register and arithmetic logic unit 20. However, Table 4 presented above shows a 64 bit word having opcode mnemonics identified therein wherein the first 28 bits, identified as bits 0–27, are employed by the register and arithmetic logic unit 20 of FIG. 9a. The sets of bits identified in Table 4 as RALU and memory access are associated with the register and arithmetic logic unit 20. These opcodes are referred to in Tables 7c and 7d above, and in Tables 9, 10 and 11 below, which provide a description of the microcode instruction set utilized to implement the control logic for the register and arithmetic logic unit 20 of the present invention.

TABLE 9

Microcode Instruction Set

| Field | Opcode | Description |
|---|---|---|
| I | 0 H | No operation |
|   | 1 M | Load RIR from multiplier output |
|   | 2 C | Load RIR from CSBUS |
|   | 3 D | Load RIR from DSBUS |
| FLG | 0 H | No operation |
|   | 1 L | Load the SMR flags with the RALU flags |
| MD | UN | Unconditional operation |
|   | EX | Extended precision operation |
|   | LT | Do operation if LT flag = 1 |
|   | GE | Do operation if LT flag = 0 |
|   | EQ | Do operation if EQ flag = 1 |
|   | NE | Do operation if EQ flag = 0 |
|   | GT | Do operation if GT flag = 1 |
|   | LE | Do operation if GT flag = 0 |
|   | CO | Do operation if CO flag = 1 |
|   | NC | Do operation if CO flag = 0 |
|   | FL | Convert FX32 to FL32 |
|   | FX | Convert FL32 to FX32 |
|   | PO | IF TRPO is true do conditional operation set SMR bit 2 (RLIM) ELSE do default operation clear SMR bit 2 (RLIM) Clear TRPO |
|   | L1 | Toggle bit 1 in SMR (RLIM) |
|   | L2 | Toggle bit 0 in SMR (RLIM) |
|   | CR | Toggle RCSR mode |
|   | DR | Toggle RDSR mode |
|   | CD | Toggle RCSD mode |
| S | 0 H | No limiter/shifter operation on result |
| S | 1 S | Perform limiter/shifter operation on RALU result as defined in SMR |
| ROP | MOV | Data Move - Logical |
|   | REPM | Replicate MSW - Logical |
|   | REPL | Replicate LSW - Logical |
|   | SWP | Swap MSW and LSW - Logical |
|   | AND | Boolean AND - Logical |
|   | XOR | Boolean Exclusive OR - Logical |
|   | ORB | Boolean OR - Logical |
|   | ZERO | Pass zero - Logical |
|   | XMOV | Data move - FX32 |
|   | XNEG | Negate - FX32 |
|   | XINC | Increment by 1 - FX32 |
|   | XDEC | Decrement by 1 - FX32 |
|   | XADD | Addition - FX32 |
|   | XSUB | Subtraction - FX32 |
|   | XSBR | Reverse subtraction - FX32 |
|   | FMOV | Data move - FL32 |

TABLE 9-continued

Microcode Instruction Set

| Field | Opcode | Description |
|---|---|---|
|   | FNEG | Negate - FL32 |
|   | FDBL | Multiply by 2 - FL32 |
|   | FHLF | Divide by 2 - FL32 |
|   | FADD | Addition - FL32 |
|   | FSUB | Subtraction - FL32 |
|   | FSBR | Reverse subtraction - FL32 |
|   | CONV | Format conversion |
|   | QMOV | Data move - Q32 |
|   | QNE | Negate - Q32 |
|   | QINC | Increment by 1 - Q32 |
|   | QDEC | Decrement by 1 - Q32 |
|   | QAA | Addition - Q32 |
|   | QSS | Subtraction - Q32 |
|   | QAS | Addition/Subtraction - Q32 |
|   | QSA | Subtraction/Addition - Q32 |
| DE | 0 H | No operation |
|   | 1 Bj | Load RALU result to Bj |
|   | 2 Ij | Load RALU direct to B |
|   | 3 Dj | Load DS bus direct to Bj |
| FI | 0 H | No operation |
|   | 1 L | Load the RALU result into the FIFO Increment to input pointer modulo 4 If FIFO is full, increment output pointer modulo 4 |
| FO | 0 H | No operation |
|   | 1 U | If FIFO is not empty, increment output pointer modulo 4 |

TABLE 10

Microcode Instruction Set
EIUC Halt Mode Instructions

| EIUC<6:3> | Opcode | Operation |
|---|---|---|
| 0 | IDLE | No operation |
| 1 | IDLE | No operation |
| 2 | LDAE | Set up to load micro store memory 19 |
| 3 | WRMS | Write micro store memory 19 |
| 4, 5 | — | Pass first part of control store bus 16 to bus 12a via RALU 20a |
| 6 | RDAE | Read micro store memory 18 via multiplier 14a and RALU 20a |
| 7 | RAEC | Read controller 17 via multiplier 14a and RALU 20a |
| 8 | IDLE | No operation |
| 9 | RESET | No operation |
| 10 | BTST | Built-in test mode |
| 11 | IDLE | No operation |
| 12 | SHFL | Shift long scan path |
| 13 | SHRS | Shift short scan path |
| 14 | SSCN | Set TMR<1> and shift short scan path |
| 15 | RSCN | Reset TMR<1> and shift short scan path |

TABLE 11

Status-Mode Register

| SMR Bit | Name | Description |
|---|---|---|
| 23 | TRPO | Trap: RALU potential overflow |
| 22 | TRIR | Trap: RALU inexact result |
| 21 | TROF | Trap: RALU overflow |
| 20 | TRIO | Trap: RALU invalid operation |
| 19 | TRUF | Trap: RALU underflow |
| 18 | — | Spare bit |
| 17 | RLTM | Flag: RALU Less than zero, MSW |
| 16 | REQM | Flag: RALU Equal to zero, MSW |
| 15 | RGTM | Flag: RALU Greater than zero, MSW |
| 14 | RCOM | Flag: RALU Carry/Overflow/Nan, MSW |
| 13 | RLTL | Flag: RALU Less than zero, LSW |
| 12 | REQL | Flag: RALU Equal to zero, LSW |
| 11 | RGTL | Flag: RALU Greater than zero, LSW |
| 10 | RCOL | Flag: RALU Carry/Overflow/Nan, LSW |
| 9-8 | RRND | Mode: RALU rounding |
| 7 | — | Spare bit |
| 6 | RRND | Mode RALU CS delay |
| 5 | RCSR | Mode RALU CS short-word read |
| 4 | RDSR | Mode RALU DS short-word read |

TABLE 11-continued

Status-Mode Register

| SMR Bit | Name | Description |
|---|---|---|
| 3 | RIDX | Mode RALU external index enable |
| 2-0 | RLIM | Mode RALU limiter/shifter |

Figure 12:
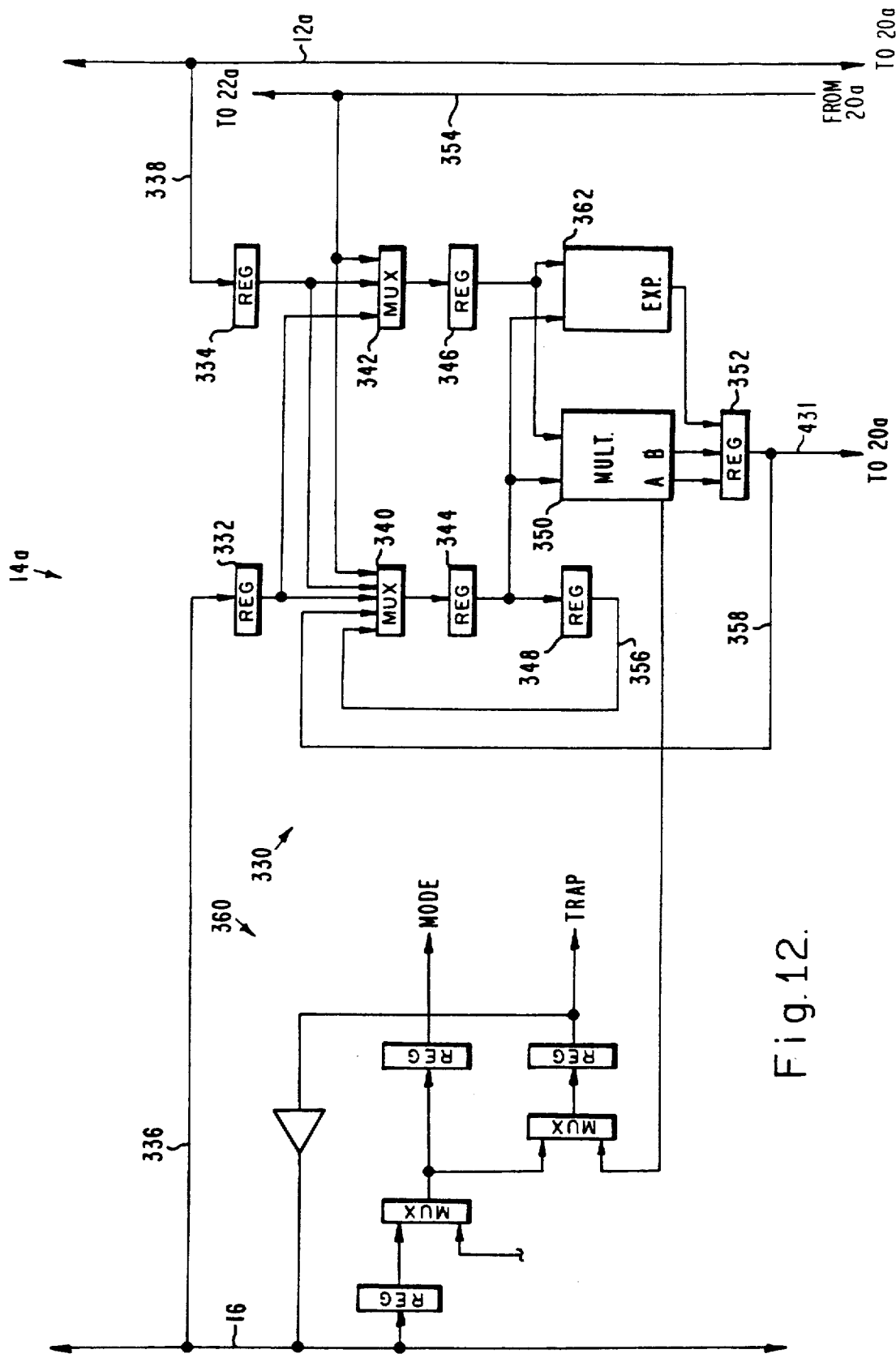
FIG. 12 is a diagram of the multiplier for use in the processor of FIG. 1.

Referring to FIG. 12, a multiplier 14 for use with the signal processor 10 of the present invention is shown, and it includes connections to the various components of the signal processor 10 shown in FIG. 1. The multiplier 14 comprises an input logic circuit 330 which includes control store and data store unpacking logic 332, 334, coupled to control store and data store busses 336, 338. Two multiple input multiplexers, comprising a five input multiplexer 340 and a three input multiplexer 342 have their inputs coupled to respective unpacking logic circuitry 332, 334 for receiving output data signals therefrom. Output of the unpacking circuitry 332, 334 are coupled from each of the logic circuitry 332, 334 to the three-input multiplexer 342 and to the five-input multiplexer 340.

Outputs from the two multiplexers 340, 342 are coupled by way of first and second registers 344, 346 to a multiplier unit 350 and to an exponent processor 362. In addition, the output of the first register 344 is coupled through a third register 348 whose output is fed back as an input to the five input multiplexer 340 along data path 356. Outputs of the multiplier unit 350 and from the exponent processor 362 are coupled to a multiplier output register 352. The output of the output register 352 is coupled to an input of the five input multiplexer 340 along data path 358 and to the register and arithmetic logic unit of the system 10.

In the signal processor 10, signals are coupled from the register and arithmetic logic unit 20 to the multiplier 14. These input signals are coupled to the remaining inputs of the two multiplexers 340, 342 along data path 354.

A status/mode logic circuit 360 is coupled to the control store bus 336 and to the multiplier unit 350. The status/mode logic circuit 360 provides status, mode and trap signals to various components of the system in order to ensure proper pipelining of the data through the multiplier 14 and the other components of the system 10. The details of the data registers and multiplexers of the status/mode circuit 360 are clearly shown in FIG. 12, and will not be discussed in detail herein.

Figure 13:
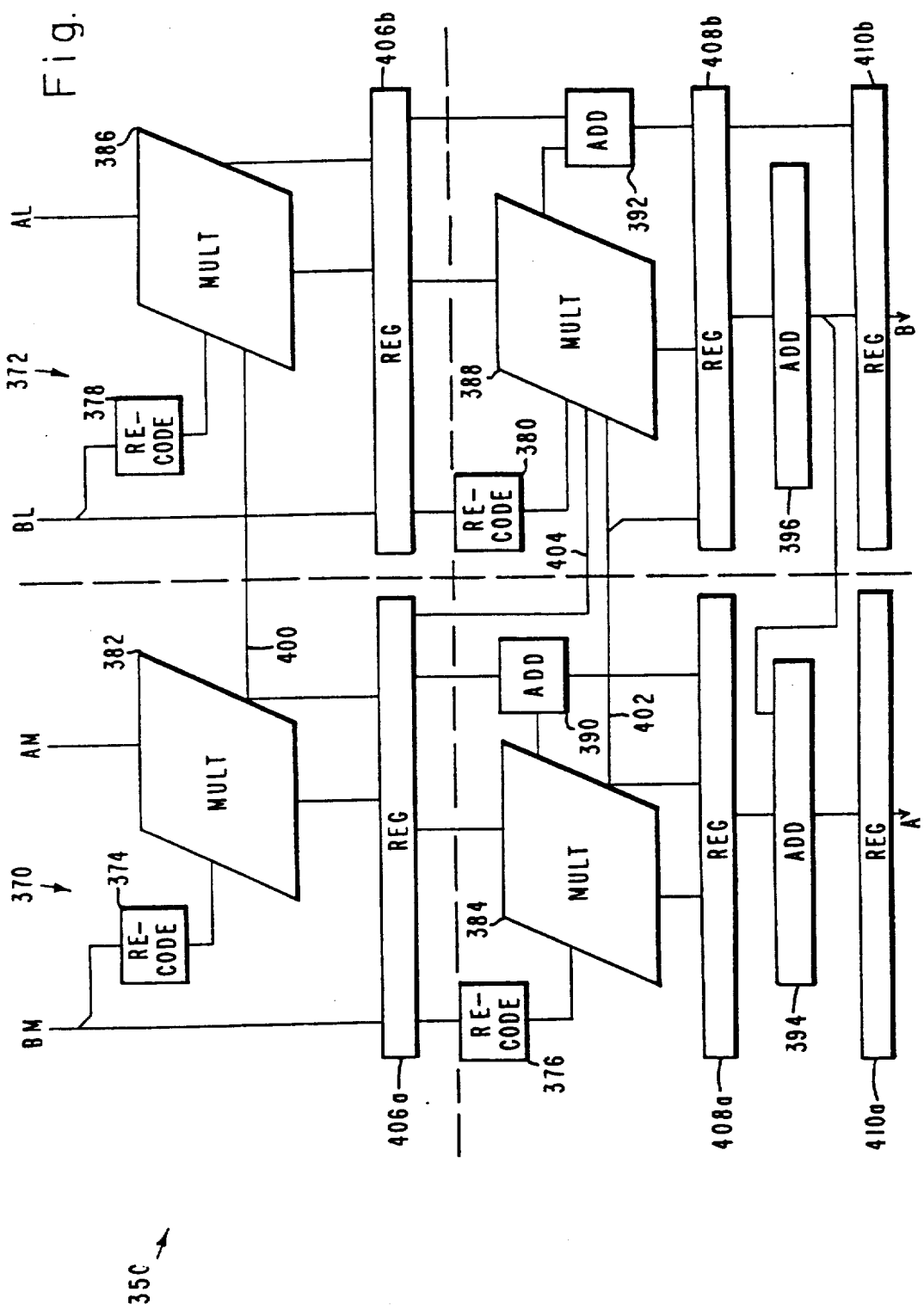
FIG. 13 is a diagram of the multiplier unit of the multiplier of FIG. 12.

Referring to FIG. 13, a detailed diagram illustrating the multiplier unit 350 of the present invention is shown. The multiplier unit 350 comprises first and second selectively interconnected parallel pipelined multiplier paths 370, 372, configured to implement a modified Booth algorithm. The modified Booth algorithm is well-known in the art and is discussed in some detail in the paper entitled "A 16 Bit×16 Bit Pipelined Multiplier Macrocell," by Dennis A Henlin et al, in IEEE *Journal of Solid-State Circuits*, Vol. SC-20, No. 2, pages 542-547, April, 1985, and in a book by K. Hwang entitled *"Computer Arithmetic,"* New York: Wiley, 1979.

The two multiplier paths 370, 372, processes the least significant words and most significant words of the first and second data words, respectively. These are identified as AL, BL and AM, BM. These data words are derived from the signals provided by the first and second registers, respectively. Each multiplier path 30, 372 comprises two recoders 374, 376 and 378, 380, which are adapted to recode the multiplicands AL, BL, in accordance with the modified Booth algorithm. Outputs of each of the recoders 374, 376, 378, 380 are coupled to respective multipliers 382, 384, 386, 388 to which they are associated.

First pipeline registers 406a, 406b are interposed between the two multipliers 382, 384 and 386, 388 of each respective path 370, 372. Second pipeline registers 408a, 408b are interposed after the second multipliers 384, 388 of each path 370, 372. Adders 390, 392 are provided at the outputs of the second multipliers 384, 388 of each path 370, 372 as is required by the modified Booth algorithm. A second set of adders 394, 396 are coupled to respective second multipliers 384, 388 of each path, and to the adders 390, 392 of each of the multiplier paths 370, 372. Outputs of each of the second set of adders 394, 396 are respectively coupled to output registers 410a, 410b, from which are provided the output products of the multiplier 350.

The first multiplier path 370 is connected to the second multiplier path 372 at a variety of points. The first and second multipliers of each path are interconnected by way of two data paths 400, 402, while the register separating the two multipliers of the first path is connected to the second multiplier 388 of the second path 372 by way of data path 404. The adder of the second multiplier path which processes the least significant words has an output selectively coupled to the adder 394 of the second multiplier path to provide a carry input thereto. These connections are such that the two paths 370, 372 operate singularly or in parallel to process 24 bit by 24 bit or 16 bit by 16 bit data, respectively, depending upon the enabling of the connecting data paths. These interconnected data paths 370, 372 are selectively enabled when processing 32 bit floating point data, and are disabled when processing 16 bit fixed point data.

In operation, the multiplier 14 operates as follows. Data to be multiplied is provided along the two data busses 336, 338, although for the implementation in the signal processor 10, a data path from the register and arithmetic logic unit thereof is additionally provided. The data is provided in either 16 bit fixed point format or 32 bit floating point format.

In the dual 16 bit mode, the data in each path is partitioned into a least significant word and a most significant word and applied to the multiplier unit 350. In dual 16 bit fixed point mode, the two parallel multiplier paths 370, 372 are not interconnected and the two paths process the data to produce 16 bit inner and outer products in a conventional manner. When the multiplier 350 is operated in 32 bit floating point mode, the two multiplier paths 370, 372 are interconnected and 24 bits of the 32 bit wide data path are employed for the multiplication process. The 8 additional bits comprise the exponent which is processed in parallel by the exponent processor 362 in a generally conventional manner.

The multiplier 14 also provides for the multiplication of data by data that does not change during each clock pulse without necessitating the use of the data busses 336, 338. This is accomplished by means of the register 348 and its feedback loop to the five input multiplexer 340. This feedback loop permits recycling of the previously used data during every other clock pulse. In addition, the final product of the multiplier 14 may be used as a multiplicand by feeding this product back to the five input multiplexer by way of data path 358.

The multiplier operates on two 32 bit data words and performs two 16 bit by 16 bit or one 24 bit by 24 bit multiplication. After 3 clock delays, two 32 bit or one 48 bit product is provided as an output from fixed and floating point operations, respectively. In parallel with the multiplication operations, the floating point product exponent is calculated.

The multiplier 14 is thus capable of forming complex arithmetic fixed point products during every other clock pulse. Two 16 bit by 16 bit fixed point products or one 32 bit floating point product is initiated on every clock pulse and the results are available after a fixed pipeline delay on a continuous basis. The fixed and floating point pipeline operations may also be interleaved for 32 bit floating point computations. The 32 bit input operands are selected from the three external sources (CSDATA, DSDATA and RALU) or from the last output product.

The multiplier 14 performs complex fixed and floating point arithmetic multiplications on a plurality of selected input words having a predetermined data word length (32 bits). The first and second selectively interconnected parallel pipelined multiplier paths are configured to implement the modified Booth algorithm. The two multiplier paths process the least significant words and most significant words of the input words. Each multiplier path includes two recoders which are adapted to recode the multiplicands in accordance with the modified Booth algorithm. The first multiplier path is connected to the second multiplier path at a variety of points. These data paths are selectively enabled when processing 32 bit floating point data, and are disabled when processing 16 bit fixed point data.

The parallel and interleaved architecture of the multiplier 14 permits processing of 32 bit data input words in either 16 bit by 16 bit fixed point data word format or one 32 bit floating point data word format. Selectively decoupling the two multiplier paths permits processing of the 32 bit input data word in the form of two 16 bit by 16 bit fixed point data words to produce two 16 bit by 16 bit fixed point products. Selectively coupling the two multiplier paths together permits processing of one 32 bit floating point data word to produce one 32 bit floating point product.

The multiplier also includes an exponent processor coupled in parallel with the multiplier which processes exponential values associated with floating point multiplications performed by the multiplier 14.

No control lines or logic have been shown in the drawing for the multiplier 14. However, Table 4 above shows a 64 bit word having opcode mnemonics identified therein wherein bits 28-35, are employed by the multiplier 14 of FIG. 12. The sets of bits identified in Table 4 as Multiplier and Memory access are associated with the multiplier 14. These opcodes are referred to in Tables 7c and 7d above, and in Tables 11 through 13 below, which provide a description of the microcode instruction set for the control store words (CSDATA) and data store words (DSDATA) utilized to implement the control logic for the multiplier 14 of the present invention. The EIUC halt mode instructions for the multiplier 14 are provided in Table 10 above.

TABLE 11

Microcode Instruction Set
A and B Operand Selections - msdata <35:31>

| Bit (octal) | Opcode | Operand Selected A | B |
|---|---|---|---|
| 00 | HH | Hold, A1=A1 | Hold, B1=B1, B2=B2 |
| 01 | HR | Hold, A1=A1 | B1=RALU, B2=B1 |
| 02 | HC | Hold, A1=A1 | B1=CSDATA, B2=B1 |
| 03 | HD | Hold, A1=A1 | B1=DSDATA, B2=B1 |
| 04 | HM | Hold, A1=A1 | B1=Mout, B2=B1 |
| 05 | HE | Hold, A1=A1 | Exchange, B1=B2, B2=B1 |
| 06 | HS1 | Hold, A1=A1 | Swap B1 MSW and LSW, hold B2 |
| 07 | RH | A1=RALU | Hold, B1=B1, B2=B2 |
| 10 | SH | Swap A1 MSW and LSW | Hold, B1=B1, B2=B2 |
| 11 | SR | Swap A1 MSW and LSW | B1=RALU, B2=B1 |
| 12 | SC | Swap A1 MSW and LSW | B1=CSDATA, B2=B1 |
| 13 | SD | Swap A1 MSW and LSW | B1=DSDATA, B2=B1 |
| 14 | SM | Swap A1 MSW and LSW | B1=MOUT, B2=B1 |
| 15 | SE | Swap A1 MSW and LSW | Exchange, B1=B2, B2=B1 |
| 16 | SS | Swap A1 MSW and LSW | Swap B1 MSW and LSW, hold B2 |
| 17 | RR | A1=RALU | B1=RALU, B2=B1 |
| 20 | CH | A1=CSDATA | Hold, B1=B1, B2=B2 |
| 21 | CR | A1=CSDATA | B1=RALU, B2=B1 |
| 22 | CC | A1=CSDATA | B1=CSDATA, B2=B1 |
| 23 | CD | A1=CSDATA | B1=DSDATA, B2=B1 |
| 24 | CM | A1=CSDATA | B1=MOUT, B2=B1 |
| 25 | CE | A1=CSDATA | Exchange, B1=B2, B2=B1 |
| 26 | CS | A1=CSDATA | Swap B1 MSW and LSW, hold B2 |
| 27 | RC | A1=RALU | B1=CSDATA, B2=B1 |
| 30 | DH | A1=DSDATA | Hold, B1=B1, B2=B2 |
| 31 | DR | A1=DSDATA | B1=RALU, B2=B1 |
| 32 | DC | A1=DSDATA | B1=CSDATA, B2=B1 |
| 33 | DD | A1=DSDATA | B1=DSDATA, B2=B1 |
| 24 | DM | A1=DSDATA | B1=MOUT, B2=B1 |
| 25 | DE | A1=DSDATA | Exchange, B1=B2, B2=B1 |
| 26 | DS | A1=RALU | Swap B1 MSW and LSW, hold B2 |
| 37 | RD | A1=RALU | B1=DSDATA, B2=B1 |

TABLE 12

Microcode Instruction Set
Multiplication operations - msdata <30:28>

| Bit(octal) | Opcode | Operation |
|---|---|---|
| 0 | FLT | Floating point, A*B |
| 1 | FLX | Fixed/floating point multiply, Float (LSWA)* |
| 2 | DRD | Fixed point, MSW(MSWA*MSWB): MSW(LSWA*LSWB) |
| 3 | DLT | Fixed point, LSW(MSWA*MSWB): LSW(LSWA*LSWB) |
| 4 | XSU | Fixed point, MSWA*MSWB − LSWA*LSWB |
| 5 | XAD | Fixed point, MSWA*MSWB + LSWA*LSWB |
| 6 | QSU | MSW(MOUT):MSW(XSU(A,B)) |
| 7 | QAD | MSW(MOUT):MSW(XAD(A,B)) |

TABLE 13

Status-Mode Register

| SMR Bit | Name | Description |
|---|---|---|
| 31 | TMOF | Trap: multiplier overflow |
| 30 | TMUF | Trap: multiplier underflow |
| 29 | TMIO | Trap: multiplier invalid operation |
| 28 | TMIR | Trap: inexact result |
| 27 | MCSD | Mode: multiplier control store delay |
| 26 | MLIM | Mode: multiplier limiter |
| 25-24 | MRND | Mode: multiplier rounding |

Thus there has been described a new and improved a signal processor that has a split pipeline architecture that operates on multiple data formats employing multiple memories to accomplish high speed digital signal processing functions. The signal processor of the present invention provides for 32 bit floating point or 16 bit fixed point operations, and which may be networked with up to 16 similar processors. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A signal processor comprising:
   interface means having a serial control port and a plurality of bidirectional configurable parallel ports for transferring control and data signal between the signal processor and external devices, wherein the bidirectional configurable parallel ports are configurable as individual parallel ports or as a coupled pair of ports which form a port having the combined data path of the coupled pair of ports, said interface means including
      serial control port means for coupling control signals between a serial input port and a control signal output port,
      first parallel port means for coupling control signals between a first parallel input port and the control signal output port and for coupling data signals between the first parallel input port and a data output port,
      second parallel port means for coupling data signals between a second parallel input port and the data output port, and
      transfer and control means coupled to the serial and first parallel input ports and the control signal output port for controlling and selectively coupling the data signals between the first and second parallel input ports and the data output port;
   arithmetic element controller means coupled to the serial control port of the interface means, the arithmetic element controller means comprising a microprogram memory and a control program memory, for loading applications programs in the control program memory and running the loaded programs, and for controlling processing of control and data signals by the signal processor;
   a plurality of pipelined arithmetic elements coupled to the arithmetic element controller means and to the bidirectional configurable parallel ports of the interface means, each pipelined arithmetic element comprising a data store memory, a multiplier, and a register and arithmetic logic unit, and having the data store memory coupled to the bidirectional configurable parallel ports of the interface means for receiving and storing data signals, and coupled to the multiplier and to the register and arithmetic logic unit for performing fixed and floating point arithmetic operations on the data signals stored in the data store memory in accordance with instructions contained in the control program and the microprogram memories.

2. The signal processor of claim 1 wherein the serial and parallel port means of the interface means each comprise means for controlling tristate buffers on the control and data busses when the interface is employed in a predetermined parallel transfer mode to provide for open collector characteristics and wherein the means comprises a buffer amplifier and a pull-up resistor coupled between a voltage source and a data output of the buffer amplifier, and wherein data input signals are preceded and followed by a predetermined voltage level to drive the data busses to a known state before and after each data transmission, and wherein the pull-up resistor maintains the high voltage level at the known state, and wherein the pull-up resistor and predetermined voltage level are selected to provide for an open collector buffer amplifier having open collector characteristics.

3. The signal processor of claim 1 wherein the multiplier comprises:
   input logic means for receiving a plurality of input data words having a predetermined data word length and for selectively providing first and second output words comprising least and most significant portions of the input data words;
   multiplier means coupled to the input logic means for receiving the first and second output words, said multiplier means comprising first and second selectively interconnected parallel pipelined multiplier paths configured to implement a modified Booth algorithm which process the least significant words and most significant words of the first and second data words, respectively; and
   first and second adders coupled to respective second multipliers of each path, the adder of the first multiplier path having an output selectively coupled to an input of the adder of the second multiplier path to provide a carry input thereto.

4. A signal processor comprising:
   interface means having a serial control port and a plurality of bidirectional configurable parallel ports for transferring control and data signal between the signal processor and external devices, wherein the bidirectional configurable parallel ports are configurable as individual parallel ports or as a coupled pair of ports which form a port having the combined data path of the coupled pair of ports, said interface means including
      serial control port means for coupling control signals between a serial input port and a control signal output port,
      first 16 bit parallel port means for bidirectionally coupling control signals between a first 16 bit parallel input port and the control signal output port and for bidirectional coupling data signals between the first 16 bit parallel input port and a data output port;
      second 16 bit parallel port means for bidirectionally coupling data signal between a second 16 bit parallel input port and the data output port; and
      transfer and control means interposed between coupled to the serial and 16 bit parallel input ports and the control signal output port for controlling and selectively coupling data signals between the first and second 16 bit parallel input ports and the data output port,
   arithmetic element controller means coupled to the serial control port of the interface means, the arithmetic element controller means comprising a microprogram memory and a control program memory, for loading applications programs in the control program memory and running the loaded programs, and for controlling processing of control and data signals by the signal processor;

a plurality of pipelined arithmetic elements coupled to the arithmetic element controller means and to the bidirectional configurable parallel ports of the interface means, each pipelined arithmetic element comprising a data store memory, a multiplier, and a register and arithmetic logic unit, and having the data store memory coupled to the bidirectional configurable parallel ports of the interface means for receiving and storing data signals, and coupled to the multiplier and to the register and arithmetic logic unit for performing fixed and floating point arithmetic operations on the data signals stored in the data store memory inn accordance with instructions contained in the control program and the microprogram memories.

5. The signal processor of claim 4 wherein the transfer and control means further comprises:
 selection means coupled to the 16 bit parallel input ports for selectively coupling selected 16 bit parallel ports together to provide a 32 bit data path between the 16 bit parallel input ports and the output port.

6. The signal processor of claim 4 wherein the transfer and control means further comprises:
 means for selectively combining the first and second 16 bit parallel port means to provide a data path having the combined data path of the first and second 16 bit parallel parallel port means between the 16 bit parallel input ports and the output port.

7. A signal processor comprising:
 interface means having a serial control port and a plurality of bidirectional configurable parallel ports for transferring control and data signal between the signal processor and external devices, wherein the bidirectional configurable parallel ports are configurable as individual parallel ports or as a coupled pair of ports which form a port having the combined data path of the coupled pair of ports, said interface means including
  serial control port means for coupling the control signals between the signal processor and the external devices,
  first parallel port means for coupling the control signals and the data signals between the signal processor and the external devices,
  second parallel port means for coupling the data signals between the signal processor and the external devices,
  third parallel port means for coupling the data signals between the signal processor and the external device,
  fourth parallel port means for coupling the data signals between the signal processor and the external devices, and
  transfer and control means coupled to the serial and parallel port means and the two data busses of the signal processor for controlling and selectively coupling the data signals between the signal processor and the external devices along the two data busses;
 arithmetic element controller means coupled to the serial control port of the interface means, the arithmetic element controller means comprising a microprogram memory and a control program memory, for loading applications programs in the control program memory and running the loaded programs, and for controlling processing of control and data signals by the signal processor;
 a plurality of pipelined arithmetic elements coupled to the arithmetic element controller means and to the bidirectional configurable parallel ports of the interface means, each pipelined arithmetic element comprising a data store memory, a multiplier, and a register and arithmetic logic unit, and having the data store memory coupled to the bidirectional configurable parallel ports of the interface means for receiving and storing data signals, and coupled to the multiplier and to the register and arithmetic logic unit for performing fixed and floating point arithmetic operations on the data signals stored in the data store memory inn accordance with instructions contained in the control program and the microprogram memories.

8. The signal processor of claim 7 wherein the transfer and control means further comprises:
 selection means coupled to the first, second third and fourth parallel port means for selectively coupling selected parallel port means together to provide a data path having the combined data path of the selected parallel port means.

9. A signal processor comprising:
 interface means having a serial control port and a plurality of bidirectional configurable parallel ports for transferring control and data signal between the signal processor and external devices, wherein the bidirectional configurable parallel ports are configurable as individual parallel ports or as a coupled pair of ports which form a port having the combined data path of the coupled pair of ports;
 arithmetic element controller means coupled to the serial control port of the interface means, the arithmetic element controller means comprising a microprogram memory and a control program memory, for loading applications programs in the control program memory and running the loaded programs, and for controlling processing of control and data signals by the signal processor, said arithmetic element controller including
  first address generation means coupled to the data store memory, control store memory and micro store memory, respectively, for generating memory addresses therefor in response to control signals derived from the control store memory,
  second address generation means coupled to the interface and the control store and data store memories for processing memory requests derived from the interface and for generating control store memory addresses in response thereto, which control store memory addresses address parameters stored in the control store memory from which data store memory addresses are generated, and
  memory access controller means coupled to the first and second address generation means, for controlling access to the respective data store and control store memories by the respective first and second address generation means;
 a plurality of pipelined arithmetic elements coupled to the arithmetic element controller means and to the bidirectional configurable parallel ports of the interface means, each pipelined arithmetic element comprising a data store memory, a multiplier, and a register and arithmetic logic unit, and having the data store memory coupled to the bidirectional configurable parallel ports of the interface means for receiving and storing data signals, and coupled to the multiplier and to the register and arithmetic logic unit for performing fixed and floating point arithmetic operations on the data signals stored in the data store memory inn accordance with instructions contained in the control program and the microprogram memories.

10. The signal processor of claim 9 wherein the first address generation means comprises:
   a general purpose address generator coupled to the control store memory for receiving control signals therefrom, and comprising a register file and an extended register file whose outputs are coupled to an arithmetic unit which processes output signals derived therefrom and which provides inputs to data store and control store memory address logic means;
   data store memory address logic means coupled between the general purpose address generator and the data store memory for generating data store memory addresses in response to signals provided by the general purpose address generator; and
   control store memory address logic means coupled between the general purpose address generator and the control store memory for generating control store memory addresses in response to signals provided by the general purpose address generator;
   micro store memory address logic means coupled to the control store memory and the micro store memory for generating memory addresses for the micro store memory.

11. The signal processor of claim 10 wherein the second address generation means comprises:
   controller means for receiving memory access requests from the interface and for generating separate control store memory and data store memory requests therefrom;
   address generation logic means for receiving control signals from the control store memory and for generating data store memory addresses therefrom.

12. The signal processor of claim 11 wherein the address generation logic means comprises:
   cache memory means for storing sets of control parameters received from the control store memory, which control parameters comprise segment, offset bias and word count data;
   means for adding the offset and segment parameters to generate a data store memory address;
   decrementing logic means for utilizing the count parameter in determining the number of words to transfer to the data store memory; and
   second adder means for combining the bias and offset parameters to provide a new offset which is stored in the cache memory means.

13. The signal processor of claim 9 wherein the memory access controller means comprises:
   arbitration logic means coupled to the first and second address generation means, for arbitrating between requests for data store memory access and control store memory access therefrom.

14. The signal processor of claim 9 wherein the second address generation means comprises:
   controller means for receiving memory access requests from the interface and for generating separate control store memory and data store memory requests therefrom;
   address generation logic means coupled to the interface for receiving data signals concerning the source of the memory request, and for receiving control signals from the control store memory and for generating control store memory and data store memory addresses therefrom.

15. The signal processor of claim 14 wherein the address generation logic means comprises:
   cache memory means for storing sets of control parameters received from the control store memory, which control parameters comprise segment, offset bias and word count data;
   means for adding the offset and segment parameters to generate a data store memory address;
   decrementing logic means for utilizing the count parameter in determining the number of words to transfer to the data store memory; and
   second adder means for combining the bias and offset parameters to provide a new offset which is stored in the cache memory means.

16. A signal processor comprising:
   interface means having a serial control port and a plurality of bidirectional configurable parallel ports for transferring control and data signal between the signal processor and external devices, wherein the bidirectional configurable parallel ports are configurable as individual parallel ports or as a coupled pair of ports which form a port having the combined data path of the coupled pair of ports;
   arithmetic element controller means coupled to the serial control port of the interface means, the arithmetic element controller means comprising a microprogram memory and a control program memory, for loading applications programs in the control program memory and running the loaded programs, and for controlling processing of control and data signals by the signal processor;
   a plurality of pipelined arithmetic elements coupled to the arithmetic element controller means and to the bidirectional configurable parallel ports of the interface means, each pipelined arithmetic element comprising a data store memory, a multiplier, and a register and arithmetic logic unit, and having the data store memory coupled to the bidirectional configurable parallel ports of the interface means for receiving and storing data signals, and coupled to the multiplier and to the register and arithmetic logic unit for performing fixed and floating point arithmetic operations on the data signals stored in the data store memory in accordance with instructions contained in the control program and the microprogram memories, said register and arithmetic logic unit including
      a register file having a data input and a plurality of data outputs for storing a plurality of data words,
      arithmetic logic means having a plurality of inputs coupled to the data outputs of the register file for processing data words by means of two parallel arithmetic logic units which provide fixed point and floating point arithmetic processing operations, respectively, and
   interface logic means having a plurality of data inputs for receiving data words to be processed coupled to the register file and to the arithmetic logic means, for selectively transferring data words to the register file for storage therein or transferring data words to the arithmetic logic means for processing thereby, said interface logic means having a plurality of data outputs for outputting data words from said register and arithmetic logic unit after they have been processed.

17. The register and arithmetic logic unit of claim 16 wherein each input of the plurality of data inputs of the arithmetic logic means is coupled to respective ones of the two parallel arithmetic logic units to permit processing of a plurality of predetermined data processing formats.

18. The signal processor of claim 17 wherein the register and arithmetic logic unit further comprises:
post-processing means coupled to the data output of the arithmetic logic means for providing limiting and scaling of the data words processed by the two parallel arithmetic logic units.

19. The signal processor of claim 18 wherein the post-processing means further comprises:
a first-in, first-out buffer having programmable length for controlling the length of the pipeline of the register and logic for providing queuing of the processed data words.

20. The signal processor of claim 17 wherein the register file and the fixed point arithmetic logic unit function as an accumulator.

21. The signal processor of claim 20 wherein the register file and the fixed point arithmetic logic unit function as an accumulator to provide for processing of the data words such that two 32 bit data words are accumulated into a 64 bit data word comprising two register file words or the dual 16 bit data words are accumulated into two 32 bit data words.

22. The signal processor of of claim 17 wherein the two parallel arithmetic logic units provide for processing of the data in dual 16 bit fixed point, 32 bit fixed point, 32 bit floating point and logical data processing formats.

23. A signal processor comprising:
interface means having a serial control port and a plurality of bidirectional configurable parallel ports for transferring control and data signal between the signal processor and external devices, wherein the bidirectional configurable parallel ports are configurable as individual parallel ports or as a coupled pair of ports which form a port having the combined data path of the coupled pair of ports;
arithmetic element controller means coupled to the serial control port of the interface means, the arithmetic element controller means comprising a microprogram memory and a control program memory, for loading applications programs in the control program memory and running the loaded programs, and for controlling processing of control and data signals by the signal processor;
a plurality of pipelined arithmetic elements coupled to the arithmetic element controller means and to the bidirectional configurable parallel ports of the interface means, each pipelined arithmetic element comprising a data store memory, a multiplier, and a register and arithmetic logic unit, and having the data store memory coupled to the bidirectional configurable parallel ports of the interface means for receiving and storing data signals, and coupled to the multiplier and to the register and arithmetic logic unit for performing fixed and floating point arithmetic operations on the data signals stored in the data store memory inn accordance with instructions contained in the control program and the microprogram memories, said multiplier including input logic means for receiving a plurality of input data words having a predetermined data word length and for selectively providing first and second output words comprising least and most significant portions of the input data words,
multiplier means coupled to the input logic means for receiving the first and second output words, said multiplier means comprising first and second selectively interconnected parallel pipelined multiplier paths configured to implement a modified Booth algorithm which process the least significant words and most significant words of the first and second data words, respectively; and
first and second adders coupled to respective second multipliers of each path, the adder of the first multiplier path having an output selectively coupled to an input of the adder of the second multiplier path to provide a carry input thereto.

24. The signal processor of claim 23 wherein said multiplier means further comprises:
first and second serially coupled multipliers disposed in each path, the multipliers of each respective path having recoding logic coupled the input logic means for receiving respective most significant words therefrom, and having the first multiplifiers of each respective path coupled the input logic means for receiving respective least significant words therefrom; and
an adder coupled to the first and second multipliers of each path for combining partial product outputs of the multipliers to form the output product of the multiplier.

25. The signal processor of claim 24 wherein said multiplier means further comprises:
exponent processing means coupled in parallel with the multiplier means for processing exponential values associated with floating point multiplications performed by the multiplier means.

26. The signal processor of claim 23 wherein said multiplier means further comprises:
exponent processing means coupled in parallel with the multiplier means for processing exponential values associated with floating point multiplications performed by the multiplier means.

27. The signal processor of claim 23 wherein said multiplier means further comprises a multiplier comprising:
input logic means for receiving a plurality of input data words having the predetermined data word length and for selectively providing first and second output words comprising a least significant word and a most significant word; and
multiplier means coupled to the input logic means for receiving the first and second output words, said multiplier means comprising first and second selectively interconnected parallel pipelined multiplier paths configured to implement a modified Booth algorithm which process the least significant words and most significant words of the first and second data words, respectively, each path comprising first and second serially coupled multipliers, the multipliers of each respective path having recoding logic coupled the input logic means for receiving respective most significant words therefrom, the first multipliers of each respective path being coupled the input logic means for receiving respective least significant words therefrom, and an adder coupled to the first and second multipliers of each path for combining partial product outputs of the multipliers; and first and second adders coupled to respective second multipliers of each path, the adder of the first multiplier path having an output coupled to an input of the adder of the second multiplier path to provide a carry input thereto.

28. The signal processor of claim 23 wherein said multiplier means further comprises a multiplier for performing complex fixed and floating point arithmetic multiplications on input words having a 32 bit data word length, and which comprises:

input logic means for receiving a plurality of input data words having a 32 bit data word length and for selectively providing first and second output words comprising a least significant word and a most significant word;

multiplier means coupled to the input logic means for receiving the first and second output words, said multiplier means comprising first and second selectively interconnected parallel pipelined multiplier paths configured to implement a modified Booth algorithm which process the least significant words and most significant words of the first and second data words, respectively; and first and second adders coupled to respective second multipliers of each path, the adder of the first multiplier path having an output selectively coupled to an input of the adder of the second multiplier path to provide a carry input thereto;

whereby selectively decoupling the two multiplier paths permits processing of the 32 bit input data word in the form of two 16 bit by 16 bit fixed point data words to produce two 16 bit by 16 bit fixed point products, and selectively coupling the two multiplier paths together permits processing of one 32 bit floating point data word to produce one 32 bit floating point product.

* * * * *